US012685256B2

(12) United States Patent
Clapp et al.

(10) Patent No.: US 12,685,256 B2
(45) Date of Patent: Jul. 21, 2026

(54) BLADE ADAPTER AND MOUNTING PLATE FOR MULTI-BLADED MOWER

(71) Applicant: MTD PRODUCTS INC, Valley City, OH (US)

(72) Inventors: Timothy Clapp, Valley City, OH (US); Nathaniel Byrne, Valley City, OH (US); David Palcisko, Valley City, OH (US)

(73) Assignee: MTD Products Inc, Valley City, OH (US)

( * ) Notice: Subject to any disclaimer, the term of this patent is extended or adjusted under 35 U.S.C. 154(b) by 363 days.

(21) Appl. No.: 18/238,257

(22) Filed: Aug. 25, 2023

(65) Prior Publication Data

US 2024/0065146 A1 Feb. 29, 2024

Related U.S. Application Data

(60) Provisional application No. 63/400,774, filed on Aug. 25, 2022.

(51) Int. Cl.
*A01D 34/73* (2006.01)
*A01D 34/64* (2006.01)
(52) U.S. Cl.
CPC ........... *A01D 34/733* (2013.01); *A01D 34/64* (2013.01)
(58) Field of Classification Search
CPC .............................. A01D 34/733; A01D 34/64
See application file for complete search history.

(56) References Cited

U.S. PATENT DOCUMENTS

| | | | | |
|---|---|---|---|---|
| 2,898,725 A | * | 8/1959 | Roesel | A01D 34/733 |
| | | | | 56/294 |
| 2,957,295 A | | 10/1960 | Brown | |
| 3,044,241 A | * | 7/1962 | Snider | A01D 34/733 |
| | | | | 56/295 |
| 3,162,990 A | * | 12/1964 | Cook | A01D 34/73 |
| | | | | D15/17 |
| 3,320,732 A | | 5/1967 | Kirk | |

(Continued)

FOREIGN PATENT DOCUMENTS

| | | | | | | |
|---|---|---|---|---|---|---|
| CN | 110946001 A | * | 4/2020 | | ........... | A01D 75/182 |
| DE | 102015206361 A1 | * | 10/2015 | | ........... | A01D 34/733 |

(Continued)

OTHER PUBLICATIONS

Extended European Search report for EP Application No. 23193522.2, dated Feb. 7, 2024.

(Continued)

*Primary Examiner* — Arpad Fabian-Kovacs
(74) *Attorney, Agent, or Firm* — Wegman Hessler

(57) ABSTRACT

A blade adapter apparatus configured to couple multiple cutting blades to a shaft of an outdoor power equipment. The blade adapter apparatus can simplify attachment of multiple blades, which can be performed prior to interfacing with the outdoor power equipment. The blade adapter apparatus can prevent the multiple blades from being attached according to an improper orientation and prevent the multiple blades from being attached according to an improper order. The blade adapter apparatus can furthermore robustly distribute load from a high energy impact event, and/or maintain a fixed angle between blade tips of a multi-blade assembly.

8 Claims, 45 Drawing Sheets

(56) References Cited

U.S. PATENT DOCUMENTS

| | | | | |
|---|---|---|---|---|
| 3,564,824 | A * | 2/1971 | Tygh, Jr. | A01D 34/73 |
| | | | | 56/295 |
| 3,918,241 | A * | 11/1975 | Stillions | A01D 34/733 |
| | | | | 56/295 |
| 4,161,096 | A | 7/1979 | Biberger | |
| 5,881,540 | A | 3/1999 | Miller | |
| 6,205,755 | B1 * | 3/2001 | Bontrager | A01D 34/733 |
| | | | | 56/295 |
| 7,200,982 | B2 * | 4/2007 | Vandyke | A01D 75/182 |
| | | | | 56/17.5 |
| 10,123,479 | B2 * | 11/2018 | Ladd, Jr. | A01D 34/835 |
| 10,517,212 | B2 * | 12/2019 | Haun | A01D 34/733 |
| 10,759,526 | B2 * | 9/2020 | Hu | B64C 27/14 |
| 11,679,443 | B1 * | 6/2023 | Steensma | A01D 34/733 |
| | | | | 30/392 |
| 11,925,142 | B2 * | 3/2024 | Schuller-Rach | A01D 34/733 |
| 11,997,944 | B2 * | 6/2024 | Xu | A01D 34/78 |
| 2005/0011329 | A1 | 1/2005 | Briggs | |
| 2010/0326034 | A1 * | 12/2010 | Gilpatrick | A01D 34/733 |
| | | | | 56/11.8 |
| 2015/0068184 | A1 * | 3/2015 | Eavenson, Sr. | A01D 34/63 |
| | | | | 56/295 |
| 2019/0104678 | A1 * | 4/2019 | Schaedler | A01D 34/003 |
| 2020/0404840 | A1 | 12/2020 | Xu et al. | |
| 2024/0107942 | A1 * | 4/2024 | Byrne | A01D 43/063 |

FOREIGN PATENT DOCUMENTS

| | | | | |
|---|---|---|---|---|
| EP | 0187435 | | 3/1989 | |
| EP | 1611782 | | 1/2006 | |
| EP | 2589284 | | 5/2013 | |
| EP | 2656720 | | 10/2013 | |
| GB | 2282949 | | 4/1995 | |
| JP | 2000254820 A | * | 9/2000 | B27B 5/32 |
| WO | WO-2016037184 A1 | * | 3/2016 | A01D 34/733 |
| WO | WO-2022268005 A1 | * | 12/2022 | A01D 34/685 |

OTHER PUBLICATIONS

Extended European Search report for EP Application No. 23177535.4 dated Jan. 26, 2024.

* cited by examiner

600

618     604
605
606     602
610     606
612A     612
612B
614
616

2510

3020

3010

3020

3010

3720

3720

BLADE ADAPTER AND MOUNTING PLATE FOR MULTI-BLADED MOWER

CROSS-REFERENCE TO RELATED APPLICATIONS

This patent application claims the benefit of U.S. provisional application No. 63/400,774 filed Aug. 25, 2022, which is hereby incorporated by reference in its entirety.

FIELD OF DISCLOSURE

The disclosed subject matter generally pertains to apparatuses for a mower or other lawn or outdoor maintenance device having multiple cutting blades, and more specifically to a blade adapter to facilitate proper assembly of the blades on the mower and a mounting plate that secures the multiple blades as discussed herein.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly. For example, mowing machines suitable for sporting events requiring moderately precise turf, such as soccer fields or baseball outfields may not be suitable for events requiring very high-precision surfaces such as golf course greens, tennis courts and the like.

Power equipment can vary in terms of available operator positions. Some power equipment have a standing and/or walking operator positions adjacent to the power equipment (e.g., push mowers or tillers, etc.), while other power equipment have riding operator positions on the power equipment, such as a seated operating position (e.g., riding mowers, etc.) or a standing operator position (e.g., standing mowers, etc.).

Modern maintenance machines also offer multiple options for power source. The various advantages associated with electric motor engines, gasoline engines, natural gas engines, diesel engines and so forth also impact the mechanical design and engineering that go into these different maintenance devices. Meeting the various challenges associated with different maintenance and mowing applications and the benefits and limitations of different power sources results in a large variety of maintenance machines to meet consumer preferences.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Various embodiments of the present disclosure relate to a blade adapter apparatus configured to an interface with multiple blades. The blade adapter apparatus can comprise an inner surface and an outer surface. The inner surface can be configured to couple to a shaft of an outdoor power equipment motor. The outer surface can be configured to couple to multiple cutting blades. The outer surface can comprise an asymmetric buttress. The asymmetric buttress can be configured to mate with a first blade of the multiple cutting blades in a manner that prevents the first blade from being coupled according to an improper orientation. The asymmetric buttress can comprise a salient face, a first side face, and a second side face. The salient face can have a defined lateral length. The first side face can meet the salient face at a first angle relative to the lateral length. The second side face can meet the salient face at a second angle relative to the lateral length. The first angle can differ from the second angle.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
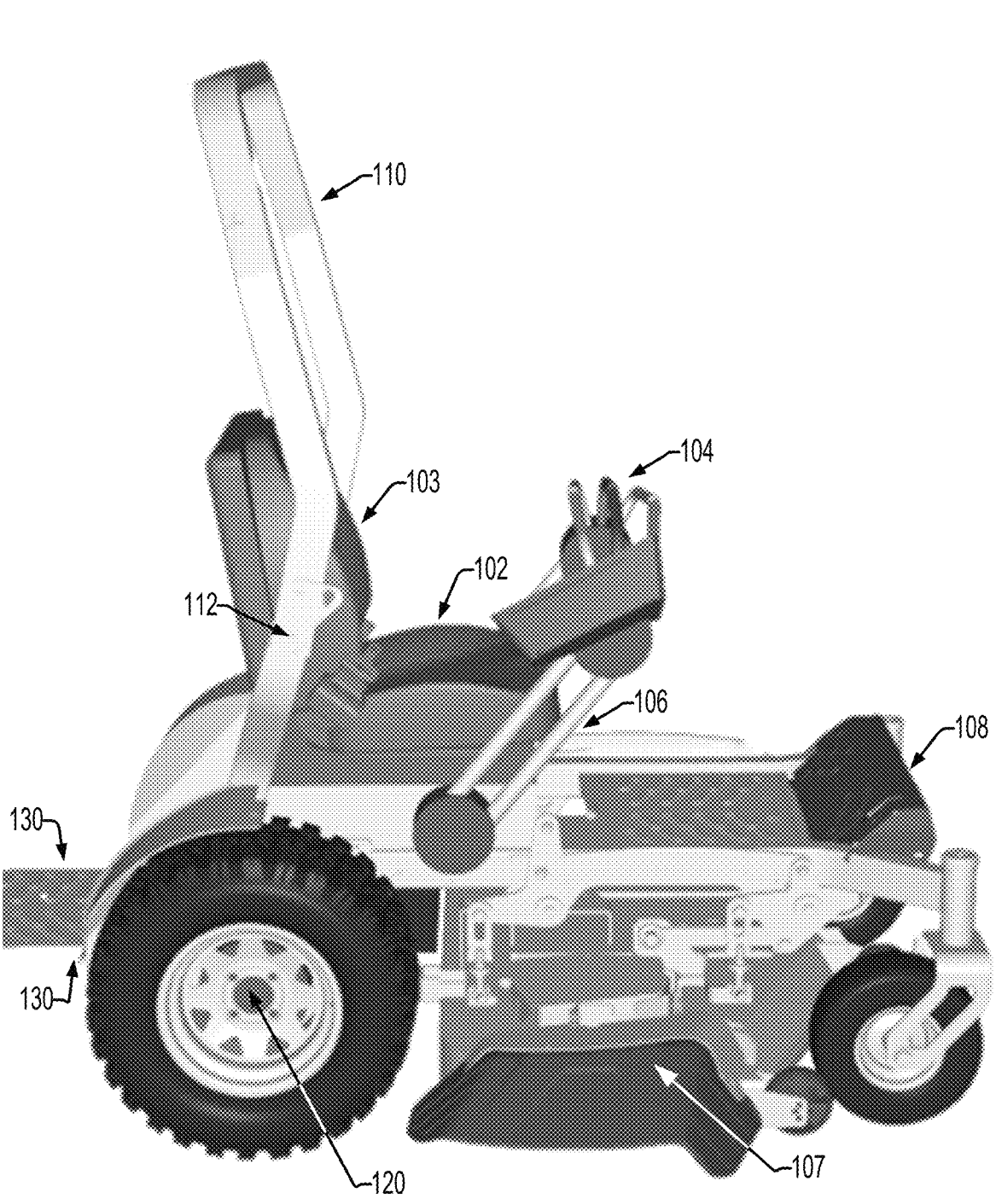
FIG. 1 provides an illustration of a convertible lawn maintenance apparatus in a seated configuration, according to disclosed embodiments.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to machine vision systems for power equipment machines are described herein, it should be understood that the disclosed machines, electronic and computing devices and methods are not so limited, and modifications may be made without departing from the scope of the present disclosure. The scope of the systems, methods, and electronic and computing devices for machine vision devices are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

Various embodiments can comprise a lawn maintenance apparatus having multiple cutting blades, the lawn maintenance apparatus comprising a blade adapter that facilitates proper assembly of the multiple cutting blades on the lawn maintenance apparatus and/or a mounting plate that secures the multiple cutting blades according to various aspects discussed herein. As used herein, the lawn maintenance apparatus can be referred to as a "mower", but it is understood that the lawn maintenance apparatus can relate to any suitable power equipment having multiple blades. A lawn maintenance apparatus can be a walk-behind mower with multiple cutting blades incorporated into an associated blade assembly. A lawn maintenance apparatus according to aspects discussed herein can be a ride-on lawn maintenance apparatus of any of a variety of configurations, such as a seated lawn maintenance apparatus, a standing lawn maintenance apparatus, or a convertible seated/standing lawn-maintenance apparatus, such as the example lawn maintenance apparatuses described in connection with FIGS. 1-5 below.

FIG. 1 illustrates a drawing of a first example lawn maintenance apparatus 100 employable as or in connection with various embodiments of the present disclosure. Lawn maintenance apparatus 100 is shown as a seated operator apparatus providing a seat upon which the operator can control lawn maintenance apparatus 100. However, in aspects of the disclosed embodiments lawn maintenance apparatus 100 can be a convertible standing/sitting lawn maintenance apparatus, in various embodiments. As illustrated in FIG. 1, lawn maintenance apparatus 100 is in a seated configuration, allowing an operator to ride in a seated position on an operator seat 102 with mower controls 104 for controlling powered operations of lawn maintenance apparatus 100 (e.g., drive functions, steering functions, and so forth, whether mechanical, electro-mechanical, hydraulic, pneumatic, or other suitable means of power operation), as well as electronic control or computer functions of lawn maintenance apparatus 100 (e.g., stored electronic settings, Global Positioning System (GPS) navigation, operator input controls/output indicators, status input controls/output indicators, and so forth). A mow deck 107 is provided beneath a support structure (e.g., frame, etc.) of lawn maintenance apparatus 100, and in the embodiment depicted by FIG. 1, between the front and rear wheels thereof. In various embodiments, mow deck 107 can be a high efficiency mow deck comprising the multiple blade adapter and/or mounting plate as discussed herein.

Figure 2:
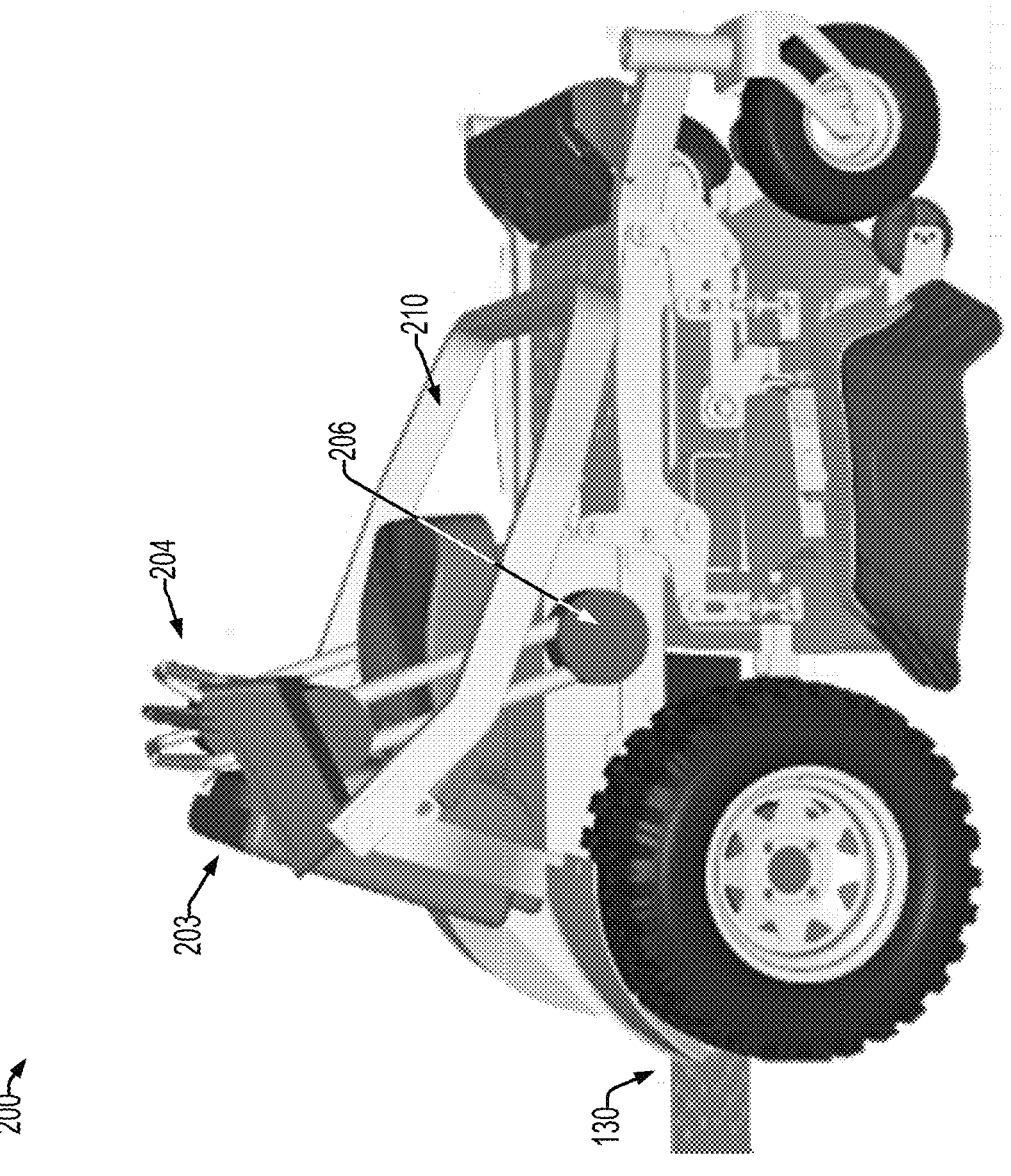
FIG. 2 depicts a picture of a convertible lawn maintenance apparatus in a standing configuration, according to further embodiments.

For instance, the lawn maintenance apparatuses shown in FIG. 1, as well as FIGS. 2-5 infra can include a multiple blade cutting system as well as the multiple blade adapter or mounting plate described with respect to FIGS. 6-20. Thus, the disclosed multiple blade adapter or mounting plate should not be interpreted as applicable to a single lawn maintenance apparatus, or even limited to the lawn maintenance apparatuses explicitly discussed in this specification. While a seated lawn maintenance apparatus is shown at FIG. 1, a standing lawn maintenance apparatus is shown at FIG. 2 and a convertible seated/standing lawn maintenance apparatus is shown at FIGS. 3A, 3B and 3C, it should be understood that these are illustrative examples only. The multiple blade adapter and mounting plate are intended to be applicable to all explicitly disclosed embodiments, those not explicitly disclosed but familiar to one of ordinary skill in the art, as well as those reasonably conveyed to one of ordinary skill in the art by way of the context provided herein; all such implementations of the multiple blade adapter, the mounting plate or the multiple blade adapter and the mounting plate are considered within the scope of the present disclosure.

With reference again to FIG. 1, in various embodiments, lawn maintenance apparatus 100 can include a roll over protection (ROP) bar 110 with a ROP anchor point 114 near to a rear wheel rotation axis 120 of lawn maintenance apparatus 100. In one or more embodiments, ROP anchor point 114 can be within about 6 inches or less of rear wheel rotation axis 120. One or more footrests 108 (e.g., individual footrests 108 for each foot or a single footrest 108) can also be provided for operator comfort.

Figures 3A, 3B, 3C:
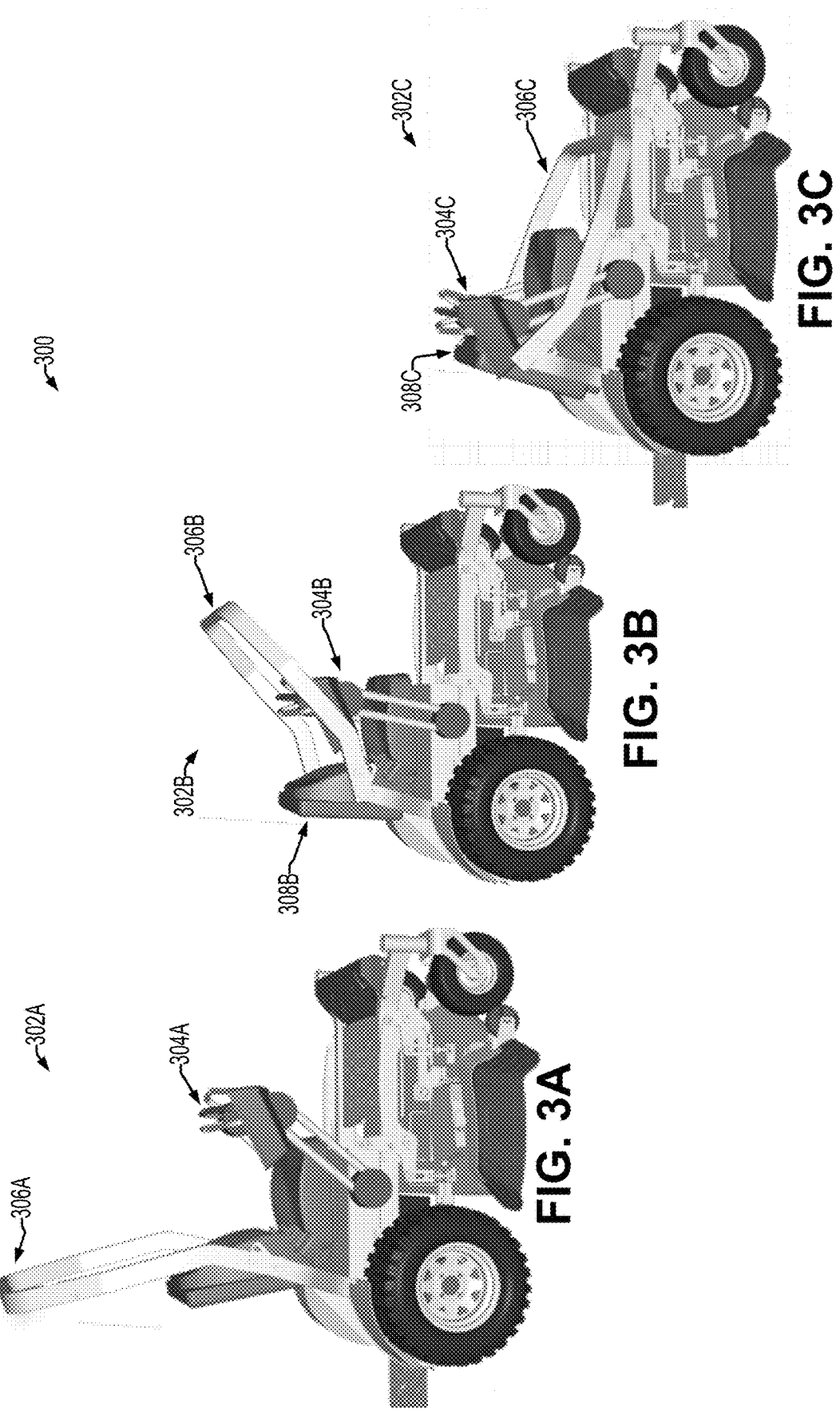
FIGS. 3A-3C illustrate progressive transition from sitting configuration to standing configuration and relative operator positioning, in further embodiments.

According to disclosed embodiments, lawn maintenance apparatus 100 can be mechanically changed to a standing configuration. A stand platform 130 is provided for an operator to stand upon while riding lawn maintenance apparatus 100 in a standing position. In a seated position, movable cushion 103 can be in a first position (for seated operation, e.g., as shown in FIGS. 1 and 3A for a first embodiment, and FIG. 4 for a second embodiment) whereby it can act as a movable cushion for a seated operator. In various embodiments, one or more of: mower controls 104, operator seat 102, movable cushion 103 and ROP bar 110 can be movable to change from the seated configuration to the standing configuration, and back again. As an example, mower controls 104 can be provided on a movable control mount 106 that can move mower controls 104 between a seated operator hand position and a standing operator hand position (as illustrated in FIGS. 3A-3C). As another example, movable cushion 103 can slide, pivot, rotate, or the like to a second position allowing an operator standing on stand platform 130 to lean against a portion (e.g., back or front, with the same or an inverted orientation relative to the first position, etc.) of movable cushion 103 (see FIG. 2, reference number 203).

In the same or other embodiments, operator seat 102 can slide, pivot, etc., to accommodate an operator standing on stand platform 130. As still another example, ROP bar 110 can fold downward away from an elevated position (as depicted by FIG. 1) by way of a ROP pivot 112. In further embodiments, any suitable combination of the foregoing can be movable parts to accommodate comfortable operator position in the seated configuration versus the standing configuration. Moreover, seated configuration and standing configuration can be selected to place the operator's head and hips at or near rear wheel rotation axis 120 to minimize centrifugal force experienced by the operator when conducting a turn of lawn maintenance apparatus 100. This head and hip position can significantly reduce unpleasant user experience resulting from tight turns, or even zero radius turns, implemented about an axis intersecting rear wheel rotation axis 120.

In still further embodiments, means for moving one or more of the movable parts (ROP bar 110, movable cushion 103, seat 102, mower controls 104, footrest 108, etc.) can be integrated into a common or linked motion so that movement of a plurality of the foregoing movable parts can be implemented by activating a single motion initiator. The motion initiator can be by mechanical (e.g., gears, pulleys, levers, pedals, bars, etc.), hydraulic, pneumatic, electro-mechanical, etc., means, resulting in movement of the plurality of movable parts, which can be one of manual, assisted manual (e.g., whereby an operator can initiate the movement with a reduced force, etc.), or automatic. As an illustrative example, an operator manually applying pressure to mower controls 104 can cause the common or linked motion means to move mower controls in conjunction with one or more of: operator seat 102, movable cushion 103, ROP bar 110, footrest 108. Said differently, an operator applying mechanical force to a mechanical motion initiator to move a first movable part (e.g., ROP bar 110, movable cushion 103, operator seat 102, mower controls 104, footrest 108, . . . ) can result in movement of the first movable part and one or more additional movable parts (e.g., ROP bar 110, movable cushion 103, operator seat 102, mower controls 104, footrest 108, . . . ). In other embodiments, the motion initiator can be a powered means such as one or more electro-mechanical motor(s), hydraulic motor(s), pneumatic motor(s) or the like, that when mechanically or electrically engaged results in movement of at least a subset of the plurality of movable parts. In such embodiments, a single control input (e.g., button press, switch turn, touch-screen activator, and so forth) can initiate the powered motion initiator. In further embodiments, a combination of mechanical and powered motion initiators are within the scope of the present disclosure. Note that in some embodiments, fewer than all movable parts can be actuated by a single motion initiator. In such embodiments, a plurality of motion initiators are provided to move respective subsets of the movable parts (e.g., a first motion initiator can be provided to move ROP bar 110, a second linked motion initiator to move both movable cushion 103 and mower controls 104, and a third motion initiator to move footrest 108; other combinations are within the scope of the present disclosure as well). In other embodiments, various elements (ROP bar 110, movable cushion 103, mower controls 104, etc.) can be independently movable, such that each can be separately adjusted between seated and standing positions without the other(s) being also adjusted between seated and standing positions.

In various embodiments, accessories could be mounted to the lawn maintenance apparatus 100. A hauling accessory (e.g., crate, box, wagon, etc.) could be mounted to a floorplate of the lawn maintenance apparatus when in standing configuration or could be mounted to stand platform 130 when in sitting configuration. In further embodiments, one or more additional seats can be provided. For instance, a foldable seat that folds out from behind movable cushion 103 or another portion of the rear of lawn maintenance apparatus 100 can be situated behind an operator in the standing configuration to briefly sit down in standing configuration. This foldable seat can have a movable cushion (similar to movable cushion 103) in an embodiment. In other embodiments, a post hole can be provided on a rear portion of lawn maintenance apparatus in which a seat-mounted post can be secured to add an additional seat in standing configuration. In yet another embodiment, when an operator stands on stand platform 130 with lawn maintenance apparatus 100 in sitting configuration, activation of movable controls to move the plurality of movable parts from the sitting configuration to the standing configuration can be implemented (e.g., in response to a pressure switch on stand platform 130 that senses a threshold weight or pressure on stand platform 130 to activate the movable controls).

FIG. 2 illustrates an embodiment of lawn maintenance apparatus 100 in a standing configuration 200. Standing configuration 200 includes mower controls moved to a rear position 204 by way of pivotable movable control mount (in rear position) 206, near an operator's hands when standing on stand platform 130. In other embodiments controls can be moved to rear position 204 by way of a translating slide and rail mechanism, or other suitable device. Additionally, a padded movable cushion (in forward position) 203 is provided for an operator to lean against when standing on stand platform 130. Likewise, ROP bar 110 is folded forward (or rearward—not depicted) at ROP pivot 112 out of an operator's physical space and field of view when standing on stand platform 130. In various embodiments, ROP bar 110 can be folded forward up against a floor plate of the lawn maintenance apparatus overlying mow deck 107 and in front of footrest 108. In other embodiments ROP bar 110 can be folded behind (and optionally tucked under) padded movable cushion 203.

FIGS. 3A, 3B and 3C illustrate transition from standing configuration 300 to seated configuration for a lawn maintenance apparatus 100 according to further disclosed embodiments. FIG. 3A illustrates an operator standing on stand platform 130 when lawn maintenance apparatus 100 is in sitting configuration 302A. Interference points 306A are illustrated with respect to ROP bar 110 and movable cushion 103. Moreover, reach of forward controls 304A beyond an operator's hands is evident. FIG. 3A illustrates that merely putting a stand platform 130 on a rear end of a lawn maintenance apparatus 100 in sitting configuration 302A is insufficient to allow the operator to operate lawn maintenance apparatus 100 in a standing position. Accordingly, at a minimum the interference points 306A must be moved to respective standing positions that comfortably accommodate the operator in standing position. FIG. 3B depicts a midway transition 302B, in which movable cushion transition 308B begins to rotate, pivot or shift forward to remove interference point 306A at a top of movable cushion 103 and instead provide a resting surface for the legs and hips of the operator. Likewise, midway transition illustrates ROP bar 110 moving forward 306B to clear the second interference point 306A, and illustrates controls moving back 304B toward the operator's hands in standing position. FIG. 3C illustrates lawn maintenance apparatus 100 in standing configuration 302C providing a hip and leg rest 308C for the operator, rearward controls 304C at an operator's hands and ROP bar fully forward and out of a field of vision of the operator.

Figure 4:
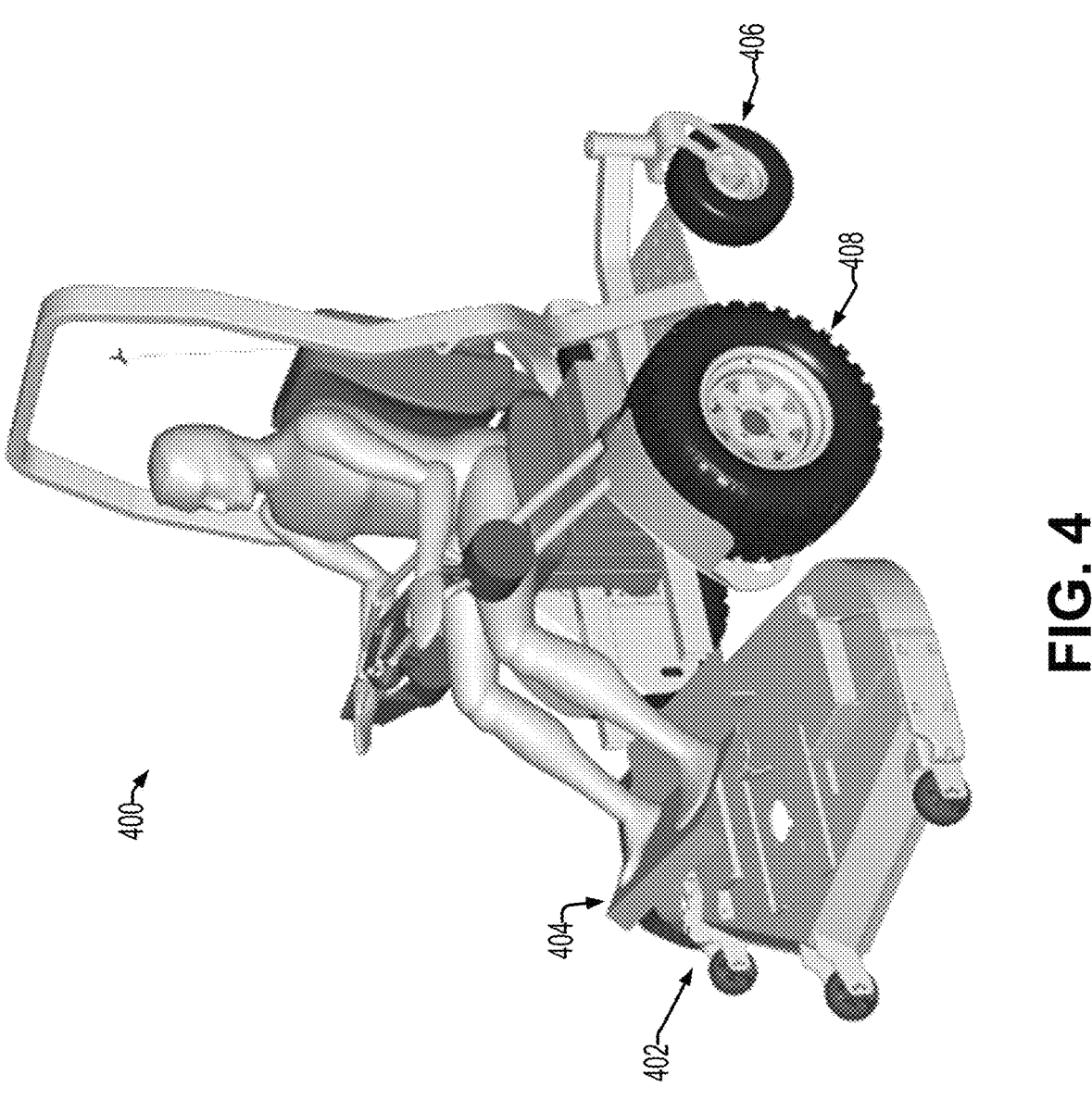
FIG. 4 illustrates an example diagram of a front-mounted convertible lawn maintenance apparatus in seated configuration, according to additional embodiments.

FIG. 4 depicts a diagram of an example front mounted lawn maintenance apparatus 400, according to alternative or additional embodiments of the present disclosure. Front mounted lawn maintenance apparatus 400 can be changed between the seated configuration illustrated in FIG. 4 and a standing configuration in FIG. 5. Front mounted mow deck 402 is positioned in front of forward drive wheels 408 (as well as rear caster wheels 406). Additionally, a front mount footrest 404 is provided on front mount mow deck 402.

Figure 5:
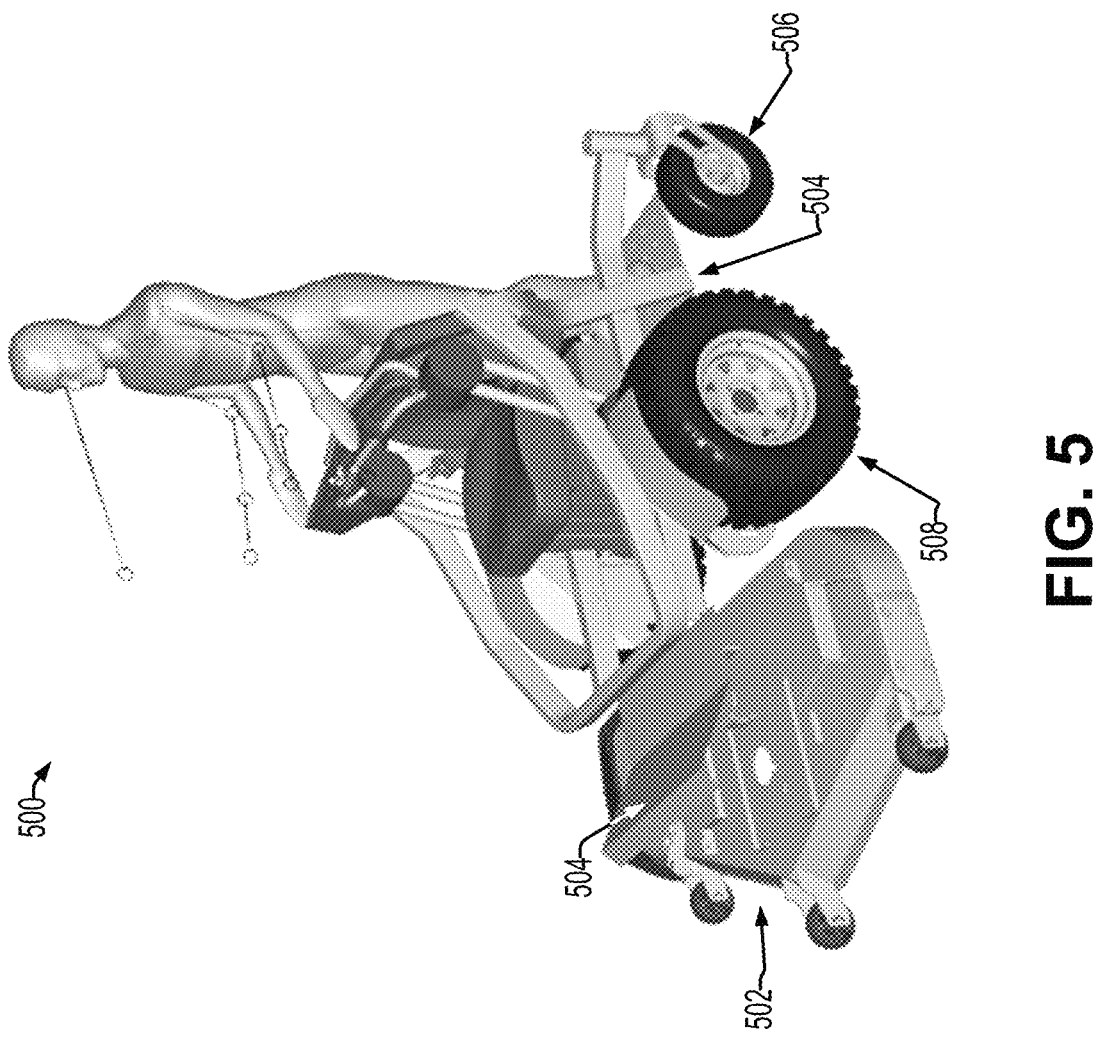
FIG. 5 depicts an example diagram of a front-mounted convertible lawn maintenance apparatus in standing configuration, in a further embodiment(s).

FIG. 5 illustrates a diagram of front mounted lawn maintenance apparatus 400 in a standing configuration 500. An operator on a stand platform 504 has the controls in a rear position coincident with their hands' natural position when standing on stand platform 504. As illustrated, front mounted lawn maintenance apparatus 400 can have a forward folded ROP while in standing configuration 500 to remove the ROP bar 110 from a field of view of the operator.

Adapter for Multiple Cutting Blades

While FIGS. 1-5 above relate to example lawn maintenance apparatuses, the remainder of the Figures are generally directed to various adapters and/or mounting plates for multiple cutting blades, such as cutting blades that are situated within the mow deck (e.g., mow deck 107 and/or front mount mow deck 402, 502).

In recent times, the lawn maintenance industry has seen a push toward battery powered machinery, moving away from conventional combustion engines. One challenge associated with this transition is that current battery-powered motors have less available energy on-hand compared to gasoline or diesel-powered mowers. To optimize efficiency, other components of the mower such as the drive and deck can be designed to use this power as efficiently as possible. Conventional cutting blade arrangements are one example of low efficiency which translates to high power consumption. Simply lowering the operating shaft speed to gain efficiency would result in lower cutting performance, however.

To overcome this challenge, conventional single-blade mowers are being adapted to multi-blade mowers, as it is possible to achieve comparable cutting performance with multiple blades with lower power consumption, which is a significant consideration of a battery-powered motor.

However, the introduction of multiple blades gives rise to several additional challenges. For example, implementing multiple cutting blades on a mower increases complexity with respect to equipment assembly, maintenance, and repair. Replacing or sharpening a blade is not as straightforward as with single-blade mowers, as the multiple blades can have different designs or functionality and the orientation and the order of installation of the blades can be more readily confused. Installing the blades in an improper orientation (e.g., upside-down such that the cutting edge faces away from the direction of rotation), relative to the mower or the other blade(s), can reduce performance. Likewise, installing the blades in an improper order can have similar negative consequences particularly when one of the blades is designed for a slightly different function and/or has a slightly different structure such as different dimensions (e.g., length). It is therefore desirable that a multi-blade configuration be easily assembled or re-assembled following maintenance with reduced chance of improperly mounting the multiple blades.

Another challenge that confronts multiple cutting blade mowers relates to various standards or regulations that must be passed to satisfy regulatory or statutory guidelines imposed on most jurisdictions. One such test, referred to as the "stake test" injects a metal rod into the path of the spinning cutting blades in order to simulate metrics relating to the blades encountering a rigid or immovable object during operation. Having multiple blades makes passing the stake test more difficult. It is observed, that whichever blade contacts the metal rod is immediately stopped, given that energy of that blade was transferred to the metal rod in a manner similar to single blade equipment. However, the other blade(s), which does not contact the metal rod, still has a significant amount of angular momentum, which can cause "scissoring" of the blades, or other challenges. It is therefore desirable for a multi-bladed mower to maintain the designed spacing or angle between one another (e.g., typically right angles for dual-blade implementations) and to prevent scissoring, even in the face of violent stoppage of the blade rotation.

Figure 6:
FIG. 6 illustrates an exploded view of a first embodiment of a multi-blade cutter assembly showing a first example multi-blade adapter, according to disclosed embodiments.

With reference now to FIG. 6, an exploded view of an example multi-blade cutter assembly 600 is illustrated showing a first example multi-blade adapter 602, according to disclosed embodiments. Multi-blade adapter 602 can function as an interface to couple shaft 604 of the multi-blade cutter assembly 600 to the multiple blades 612. When assembled, mounting nut 616 can be secured to threading 605 of shaft 604. Tongues 618 can mate with grooves of multi-blade adapter 602 (not shown, but see FIGS. 10A and 10C). Push nut 614 can be employed, e.g., to retain the multiple blades 612 in place when mounting nut is removed (e.g., during disassembly).

Examples of multiple blades 612 used herein relate to dual blade embodiments, although it is understood that more than two blades 612A, 612B are contemplated. As used herein, a single blade typically has two cutting edges, each cutting edge on opposing sides of shaft 604 and facing opposite directions according to the direction of rotation. Therefore, a dual-blade system will typically have four cutting edges. Generally, first blade 612A and second blade 612B are offset by approximately 90 degrees (e.g., orthogonal to one another and/or at right angles to one another). In this context, the term "approximately" generally implies an error of no more than one or two degrees or at most no more than five degrees. In another embodiment(s), first blade 612A and second blade 612B are offset by an angle. In some embodiments, the angle can be a range of approximately 60 degrees to approximately 120 degrees. In some embodiments, the angle can be a range of approximately 70 degrees to approximately 110 degrees. In some embodiments, the angle can be a range of approximately 80 degrees to approximately 100 degrees.

In some embodiments, first blade 612A and second blade 612B can have similar dimensions and may even be structurally identical, which can reduce manufacturing and inventory costs. In other embodiments, first blade 612A and second blade 612B can have different dimensions, such as different lengths. For example, first blade 612A can be longer than second blade 612B (or vice versa), and may operate according to a slightly different functional approach.

Figure 19:
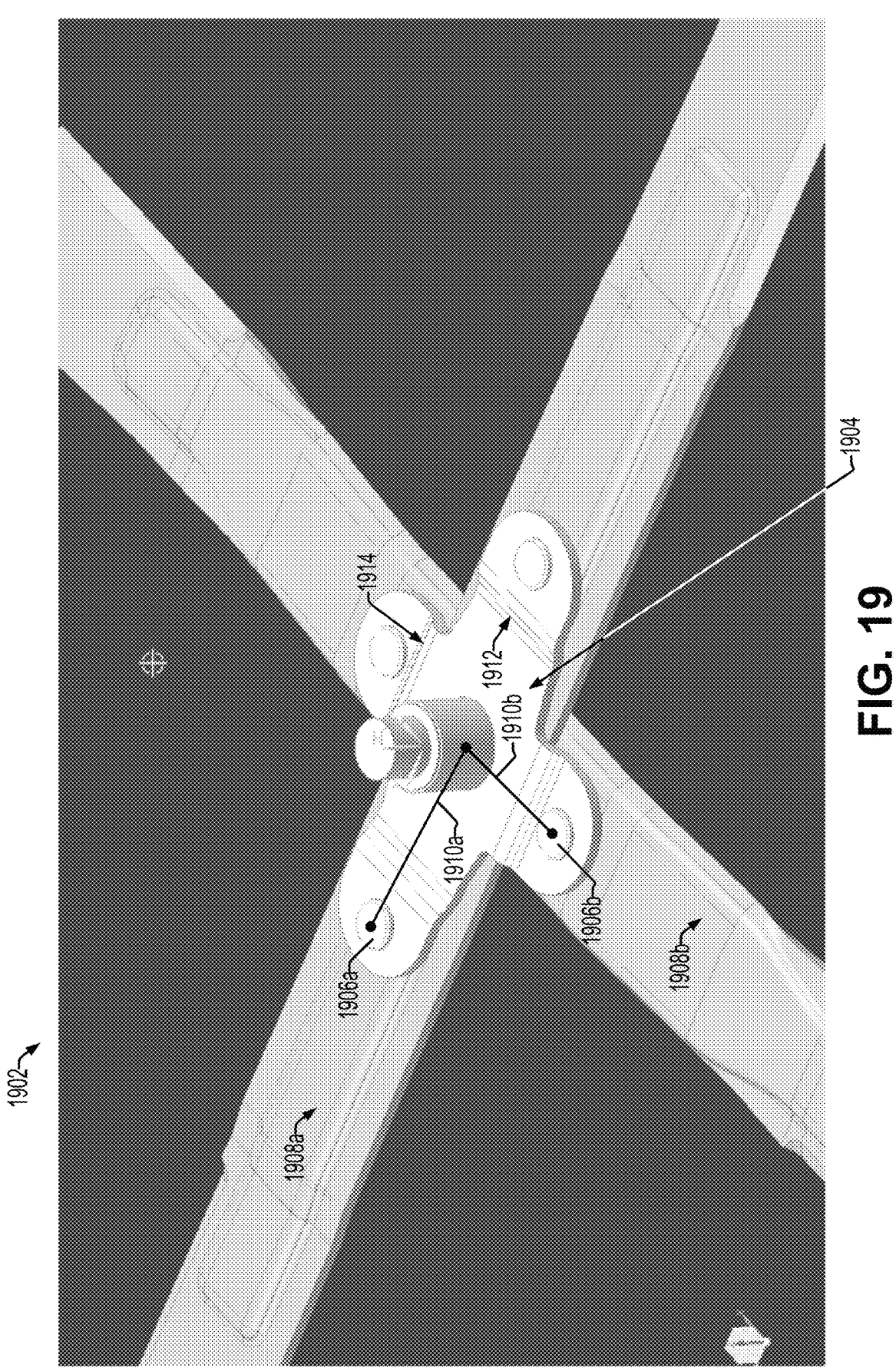
FIG. 19 illustrates a third embodiment of a multi-blade adapter.

Therefore, it can be advantageous to ensure that first blade 612A and second blade 612B are installed properly both in terms of orientation (e.g., the cutting edges lead based on the direction of rotation) and in terms of order of installation to ensure the correct blade is in the correct location. Such can be accomplished by the disclosed design of multi-blade adapter 602. Multi-blade adapter 602 can comprise top spacer 606 (further detailed with regard to FIGS. 12A through 12C), bottom spacer 608 (further detailed with regard to FIGS. 9 through 10C), and pins 610 (e.g., weld pins) that mate with corresponding apertures of multiple blades 612 in order to better secure multiple blades 612 and potentially prevent scissoring. Pins 610 can be any suitable fastener with respect to multiple blades 612. For example, FIG. 19 illustrates a nut and bolt configuration instead of using pins 610.

Figure 7:
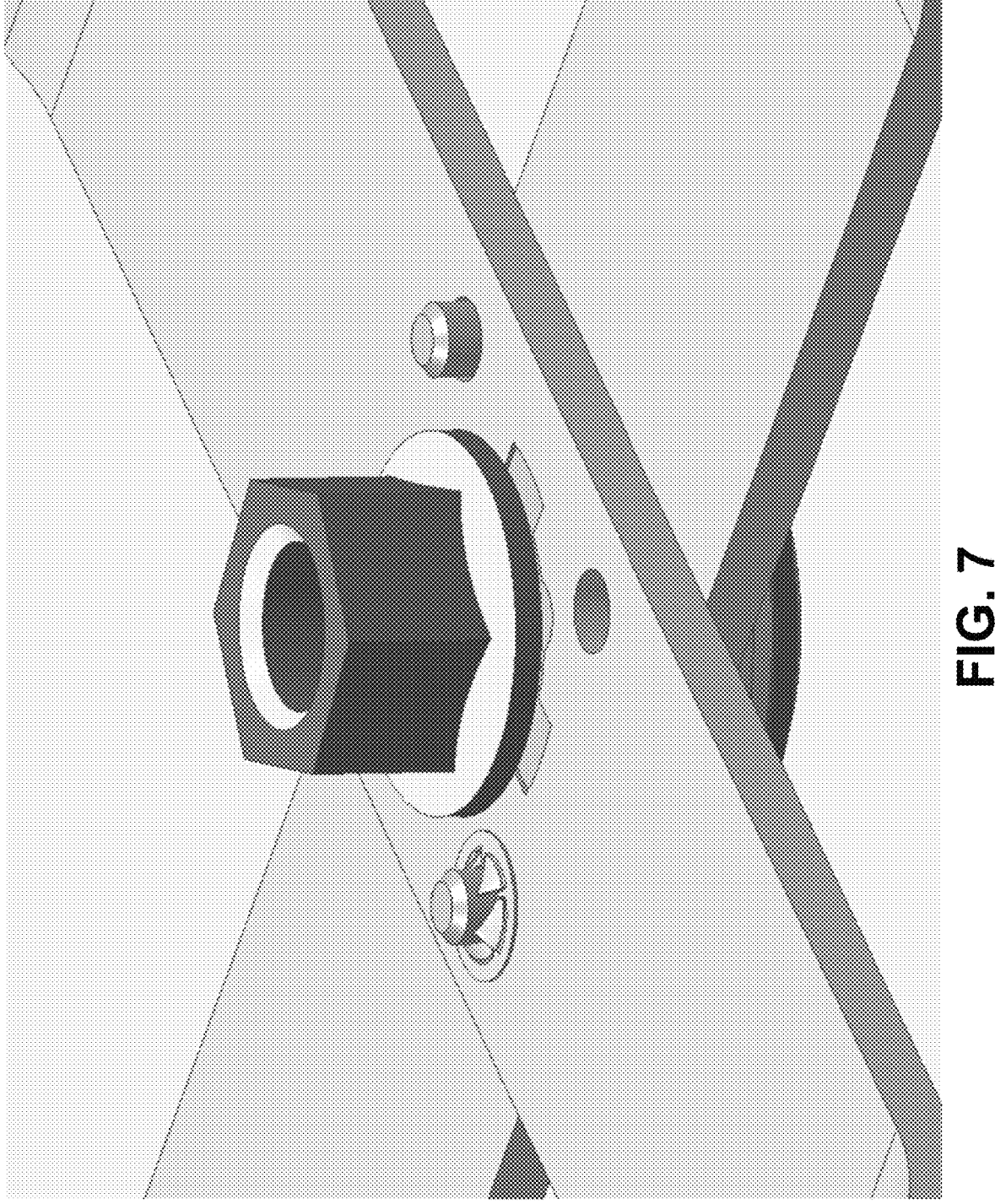
FIG. 7 illustrates an isometric perspective of the bottom view of the multi-blade cutter assembly of FIG. 6, according to disclosed embodiments.
Figure 8:
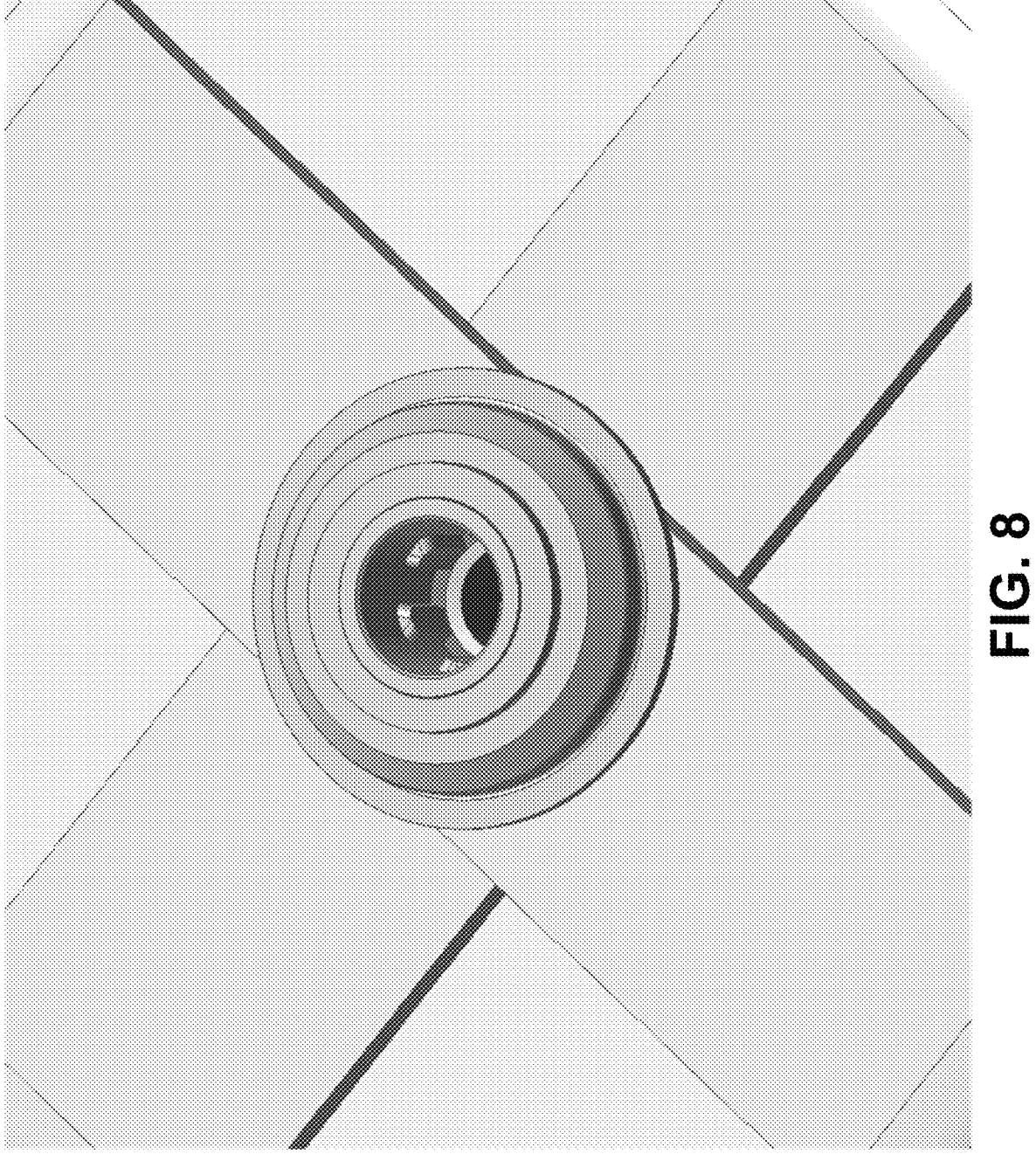
FIG. 8 illustrates an isometric perspective of the bottom view of multi-blade cutter assembly of FIG. 6, according to disclosed embodiments.

FIG. 7 illustrates an isometric perspective showing a (non-exploded) bottom view of multi-blade cutter assembly 600, according to disclosed embodiments. FIG. 8 illustrates an isometric perspective showing a (non-exploded) top view of multi-blade cutter assembly 600, according to disclosed embodiments.

Figure 9:
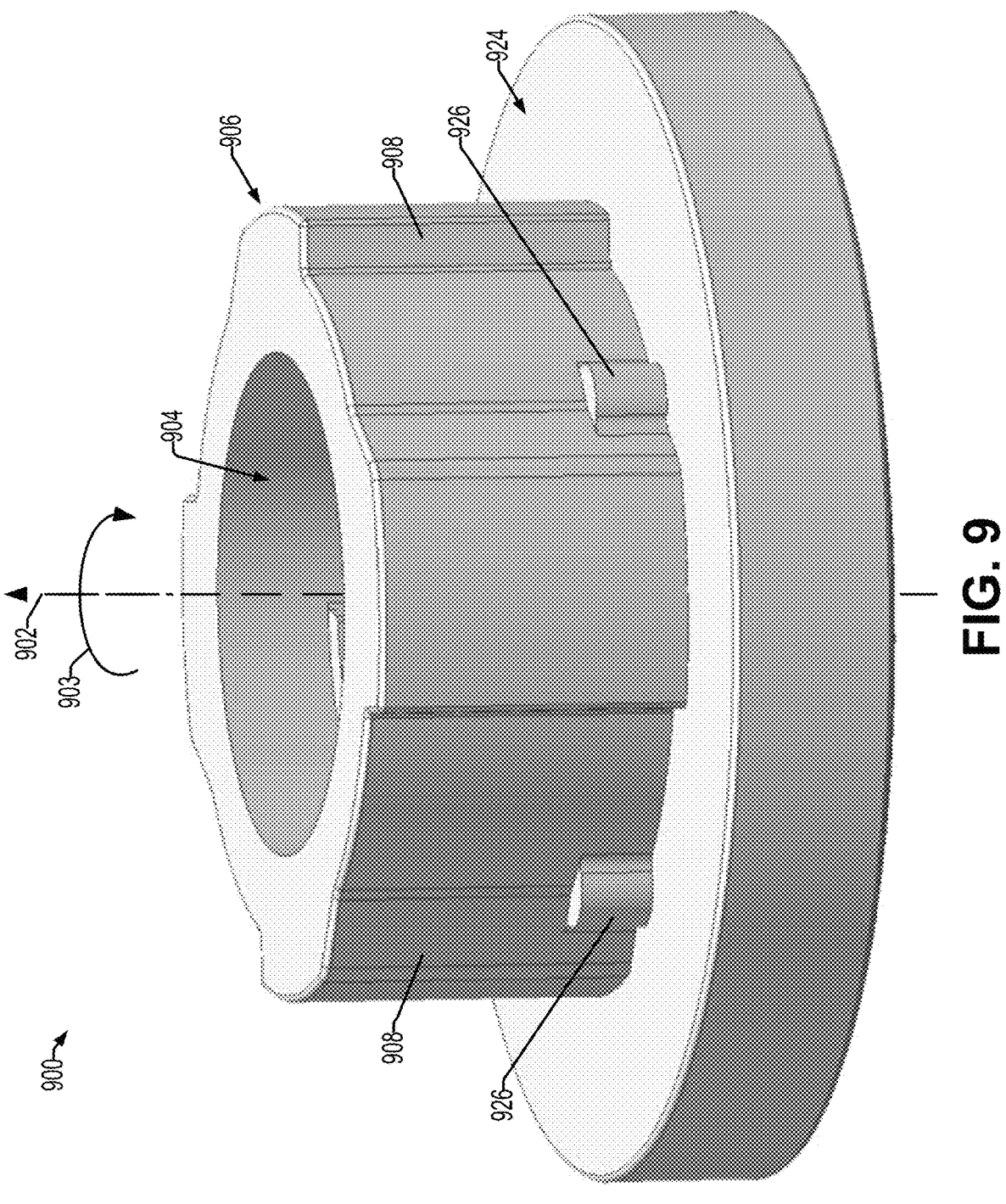
FIG. 9 illustrates an isometric view of a first embodiment of a bottom spacer, according to disclosed embodiments.
Figures 10A, 10B, 10C:
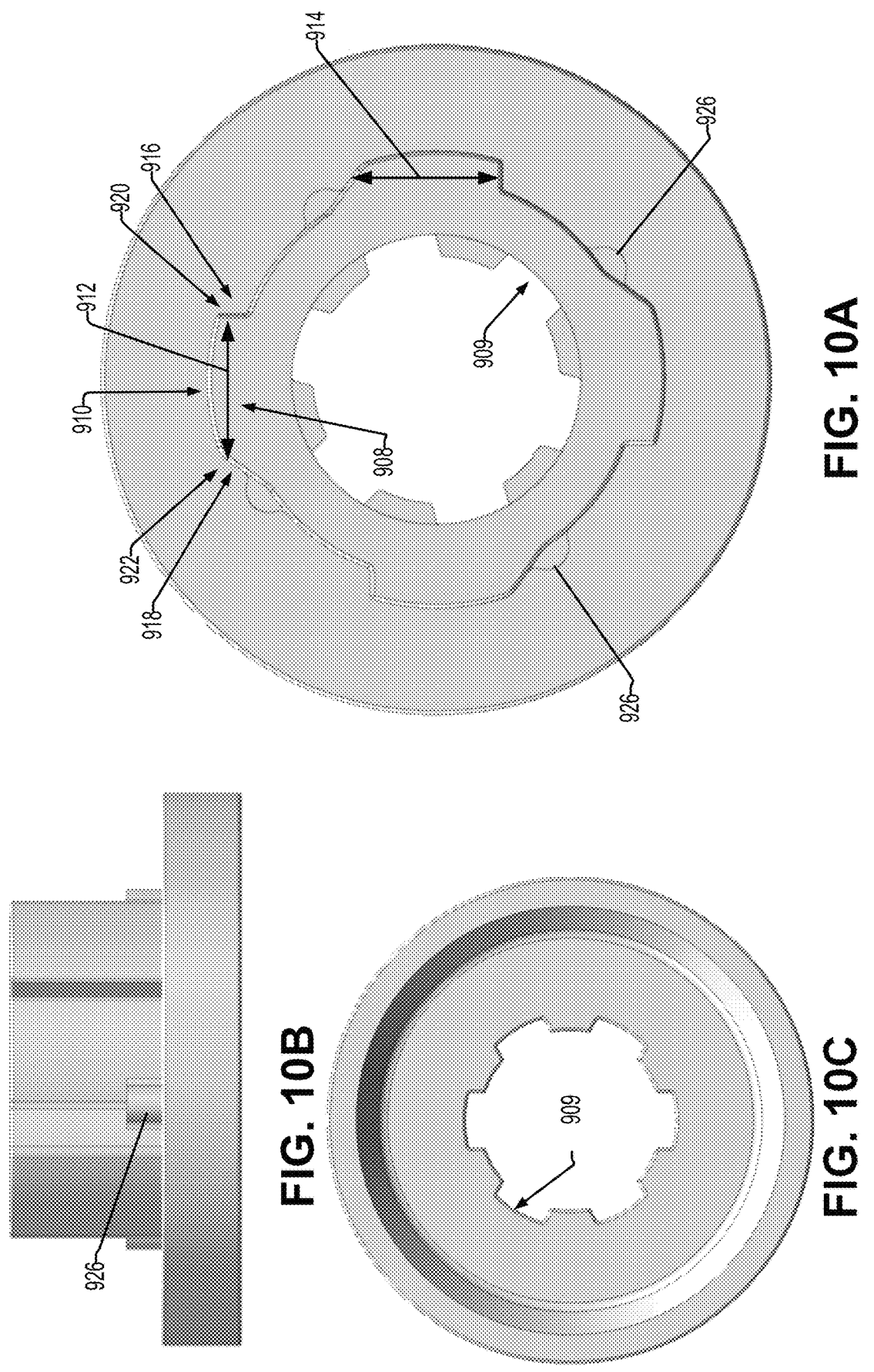
FIGS. 10A-C illustrate, respectively, a top view of the first embodiment of a bottom spacer of FIG. 9, a side view of the bottom spacer, and a bottom view of the bottom spacer.

Turning now to FIG. 9, an isometric view of bottom spacer 900 is illustrated, according to disclosed embodiments. FIGS. 10A through 10C, which can be inspected along with FIG. 9, respectively show different perspectives. For example, FIG. 10A illustrates a top view of bottom spacer 900, according to disclosed embodiments, FIG. 10B illustrates a side view of bottom spacer 900, according to disclosed embodiments, and FIG. 10C illustrates a bottom view of bottom spacer 900, according to disclosed embodiments.

In some embodiments, bottom spacer 900 can have a similar function or design to bottom spacer 608 of FIG. 6. In some embodiments, bottom spacer 900 can have certain differences in function or design to bottom spacer 608. In some embodiments, bottom spacer 608 or bottom spacer 900 can interface with multiple blades 612 from a top position (as shown in FIG. 6). In other embodiments, bottom spacer 608 or bottom spacer 900 can interface with multiple blades 612 from a bottom position (not shown, but see FIG. 13 with respect to multiple blades 1306). Bottom spacer 900 can generally be shaped as a hollow cylinder, as depicted, or another shape, having an axis of rotation 902 that corresponds to an associated shaft (e.g., shaft 604). As depicted, in some embodiments, direction of rotation 903 can be clockwise, but in other embodiments, direction of rotation 903 can be counterclockwise.

Bottom spacer 900 can comprise inner surface 904. Inner surface 904 can be configured to couple to a shaft of an outdoor power equipment motor such as shaft 604 (or shaft 1304, infra). Bottom spacer 900 can further comprise outer surface 906. Outer surface 906 can be configured to couple to multiple cutting blades such as multiple blades 612 (e.g., first blade 612A and second blade 612B). Apart from being entirely cylindrical in shape, outer surface 906 can comprise at least one asymmetric buttress 908. Typically, asymmetric buttresses 908 will appear as mirror-image (about axis of rotation 902) pairs of one another such that each blade can interface with one pair of asymmetric buttresses 908. Thus, a dual-blade embodiment will implement four asymmetric buttresses 908, as shown. Asymmetric buttress 908 (or a given pair of asymmetric buttresses 908) can be configured to mate with a one of the blades of multiple blades 612 (e.g., blade 612A) in a manner that prevents blade 612A from being coupled according to an improper orientation. For example, an improper orientation in which blade 612A is attached upside-down such that the cutting edges face away from direction of rotation 903.

Figure 11:
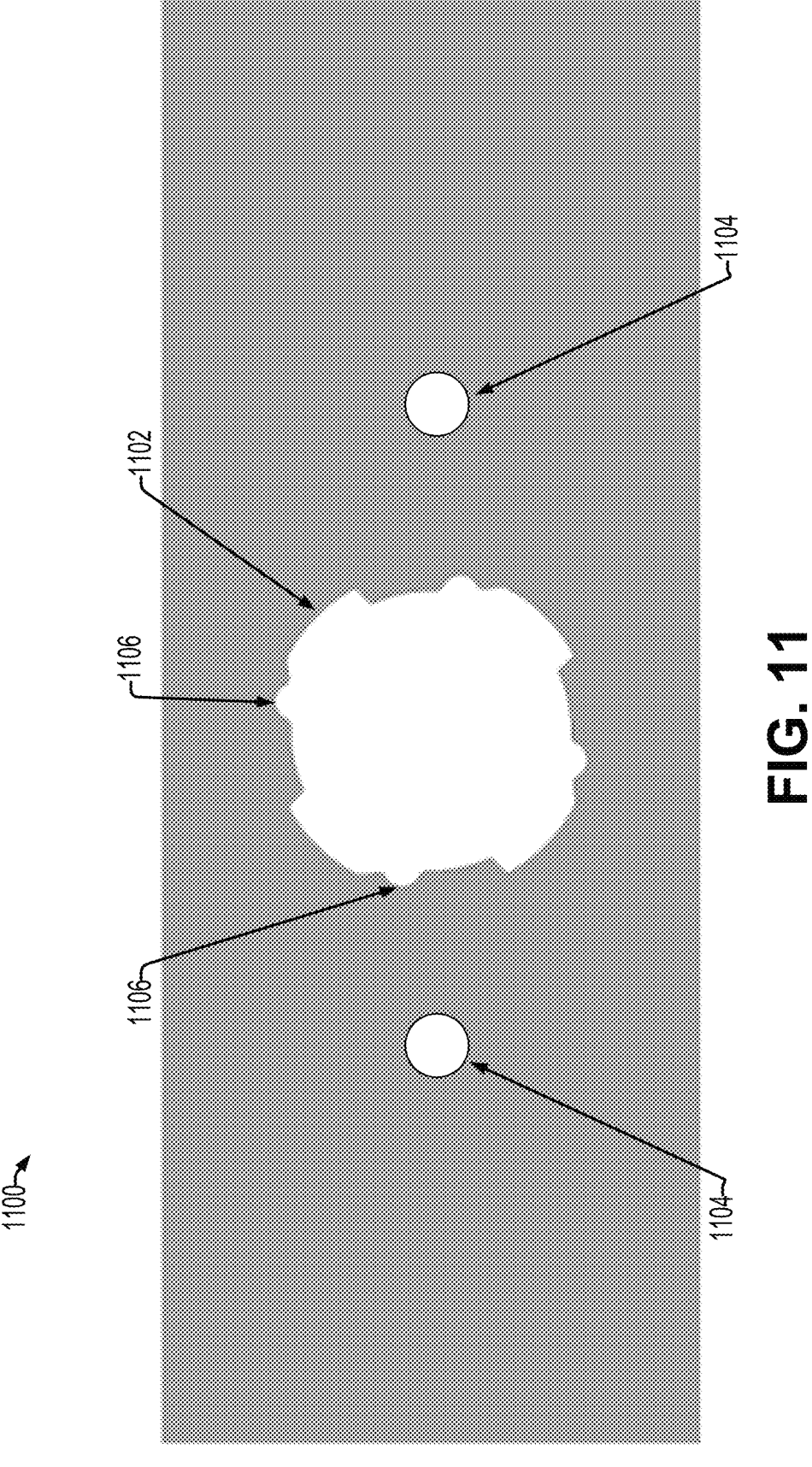
FIG. 11 illustrates a first embodiment of a blade cutout.

Such can be better observed with reference to FIG. 10A showing a top-down view of an asymmetric buttress 908, and FIG. 11, which shows an example blade cutout 100, according to disclosed embodiments. As depicted, inner surface 904 can comprise at least one groove 909 extending in an axial direction (e.g., into the page, as shown in FIG. 10A) that can mate with an associated tongue of a shaft (e.g., tongue 618 of shaft 604) such that inner surface 904 couples to the shaft.

Asymmetric buttress 908 can comprise salient face 910 having lateral length 912. Lateral length 914 of an adjacent asymmetric buttress 908 can be the same or different than lateral length 912, depending on the implementation. Since adjacent asymmetric buttresses 908 serve different blades (whereas opposing asymmetric buttresses 908 serve the same blade), in embodiments in which blade 612A differs from blade 612B, structuring lateral length 912 to differ from lateral length 914 can also be utilized to ensure elements of proper installation and/or mounting of multiple blades 612. In some embodiments, as shown, salient face 910 can have an arc shape at a defined radius from axis of rotation 902.

In addition to salient face 910, asymmetric buttress 908 can further comprise first side face 916 and second side face 918. First side face 916 can meet salient face 910 at first angle 920, where first angle 920 is relative to lateral length 912. Likewise, second side face 918 can meet salient face 910 at second angle 922 that is also relative to lateral length 912. First angle 920 and second angle 922 can differ, resulting in the asymmetry of asymmetric buttress 908. For example, in this case first angle 920 is greater than second angle 922 such that first side face 916 has a much steeper slope than second side face 918. As one result of this asymmetry, multi-blade adapter 602 can prevent blades from being attached improperly in terms of orientation. Hence, first angle 920 and second angle 922 can differ by an amount sufficient to prevent blades from being attached according to an improper orientation.

In some embodiments, the side face with the greater angle can be selected as a function of direction of rotation 903. For instance, if the direction of rotation 903 is clockwise in this top-down perspective, then first angle 920 can be greater. On the other hand, if direction of rotation 903 is counterclockwise, then second angle 922 can instead be structured to be greater than first angle 920.

Bottom spacer 900 can further comprise base disk 924. Base disk 924 can have a radius (e.g., from axis of rotation 902) that is greater than a radius of salient face 910 of asymmetric buttress 908. In some embodiments, base disk 924 can serve as a platform for mounting welding pins or the like (e.g., pins 610). In some embodiments, welding pins 610 can be integrated with top spacer 606 as illustrated in FIG. 6. As shown in FIG. 11, these pins 610 can mate with associated apertures 1104 in a manner similar to bottom spacer 900 mating with aperture 1102. It is noted that during manufacture of typical cutting blades (e.g., blades 612), the cutting blades undergo a forming process that modifies the shape of the blade. Certain forming aspects create transitions in the blade (e.g., where the blade bends or curves) that might reduce the structural strength or integrity to some degree.

Hence, in some embodiments, the radius of base disk 924 can be specifically selected to account for certain pin 610 locations. For example, the radius of pin 610 locations can be specifically selected to correspond to regions of blades 612 that are determined to have no transitions resulting from the forming process. Thus, associated aperture 1104 can be located in those regions that are determined to have no transitions.

Bottom spacer 900 can further comprise at least one dimple 926. Dimple 926 can extend in an axial direction from base disk 924, noting that a height of dimple 926 relative to base disk 924 is significantly less than a height of asymmetric buttress 908. In some embodiments, the height of dimple 926 can be less than half that of asymmetric buttress 908. In some embodiments, the height of dimple 926 can be structured to match, or be no greater than, a thickness of one of multiple blades 612.

Dimple 926 can be configured to mate with a corresponding aperture of a blade of multiple blades 612 in a manner that prevents the multiple blades 612 from being coupled according to an improper order. For example, suppose first blade 612A has dimple apertures 1106, whereas second blade 612B does not. In that case, dimple 912 ensures that first blade 612A (which has dimple apertures 1106) is attached to bottom spacer 900 prior to attaching second blade 612B (which has no dimple apertures 1106). In other words, the height of dimple 926, when the blades are attached in the proper order, can be sufficient to interface with first blade 612A, but insufficient to interface with second blade 612B.

As shown, dimple 926 can be situated between two adjacent asymmetric buttresses 908. In some embodiments, dimple 926 can be nearer to second side face 918 of one of the two adjacent asymmetric buttresses 908 than to first side face 916 of the other of the two adjacent asymmetric buttresses 908. However, it is understood that other designs are envisioned.

Figure 12A:
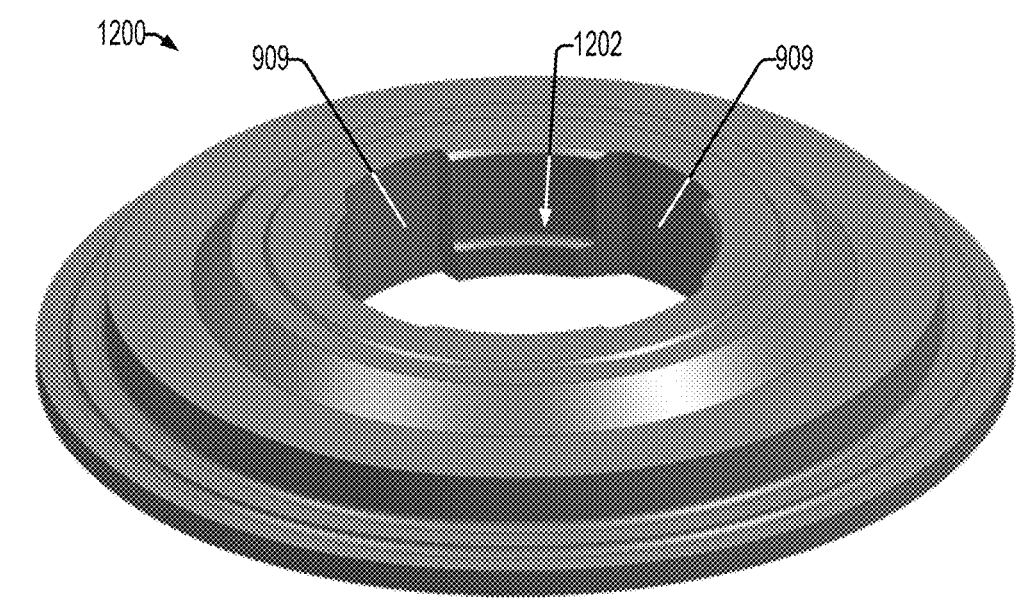
FIGS. 12A-C illustrate, respectively, an isometric view of the top spacer of FIG. 13, a side view of the top spacer, and a top view of the top spacer.
Figure 12B:
Figure 12C:
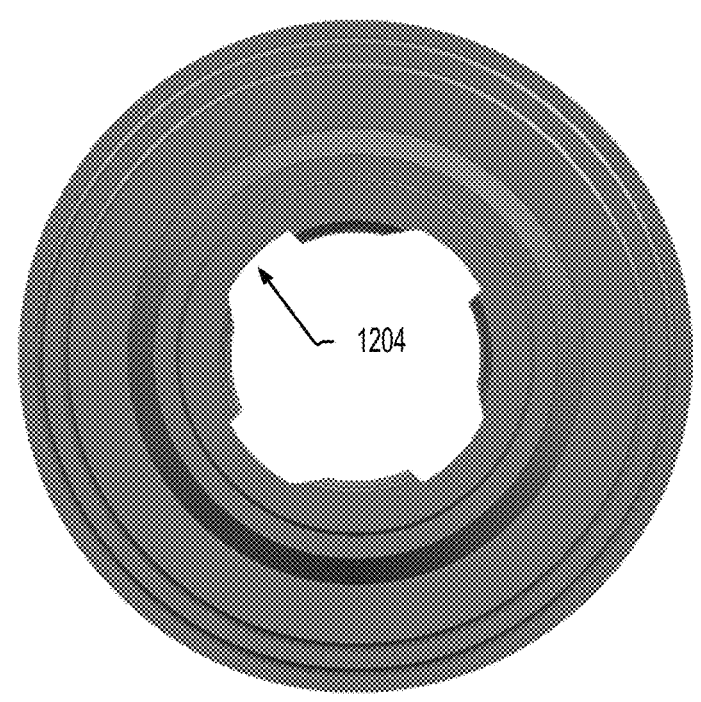

Referring now to FIGS. 12A-12C, which can be inspected together, illustrated respectively are various perspectives of top spacer 1200. For example, FIG. 12A illustrates an isometric view of top spacer 1200, according to disclosed embodiments, FIG. 12B illustrates a side view of top spacer 1200, according to disclosed embodiments, and FIG. 12C illustrates a top view of top spacer 1200, according to disclosed embodiments.

In some embodiments, top spacer 1200 can have a similar function or design to top spacer 606 of FIG. 6. In some embodiments, top spacer 1200 can have certain differences in function or design to top spacer 606. Top spacer 1200 can be configured to couple to bottom spacer 608 and/or bottom spacer 900, and can rest upon one of multiple blades 612. Top spacer 1200 can further interface with shaft 604 in a manner similar to bottom spacer 608. In that regard, top spacer 1200 can comprise inner surface 1202 that can represent an extension of inner surface 904 of bottom spacer 900, which can comprise grooves 909 that mate to associated tongues 618 of shaft 604. Depicted best in FIG. 12C, top spacer 1200 can interface with an outer surface of bottom spacer 900 such that inner surface 1202 can comprise grooves 1204 that mate to asymmetric buttresses 908.

In some embodiments, as depicted in FIG. 6, top spacer 606 (or 1200) and base disk 924 (see FIG. 9) are situated above multiple blades 612, or, in other embodiments, situated below multiple blades 612. However, in some embodiments, top spacer 606 (or 1200) and base disk 924 can be optional and/or have their functionality replaced in different embodiments by a mounting plate such as mounting plate 1310 of FIG. 13, which is illustrated as being situated below multiple blades.

Figure 13:
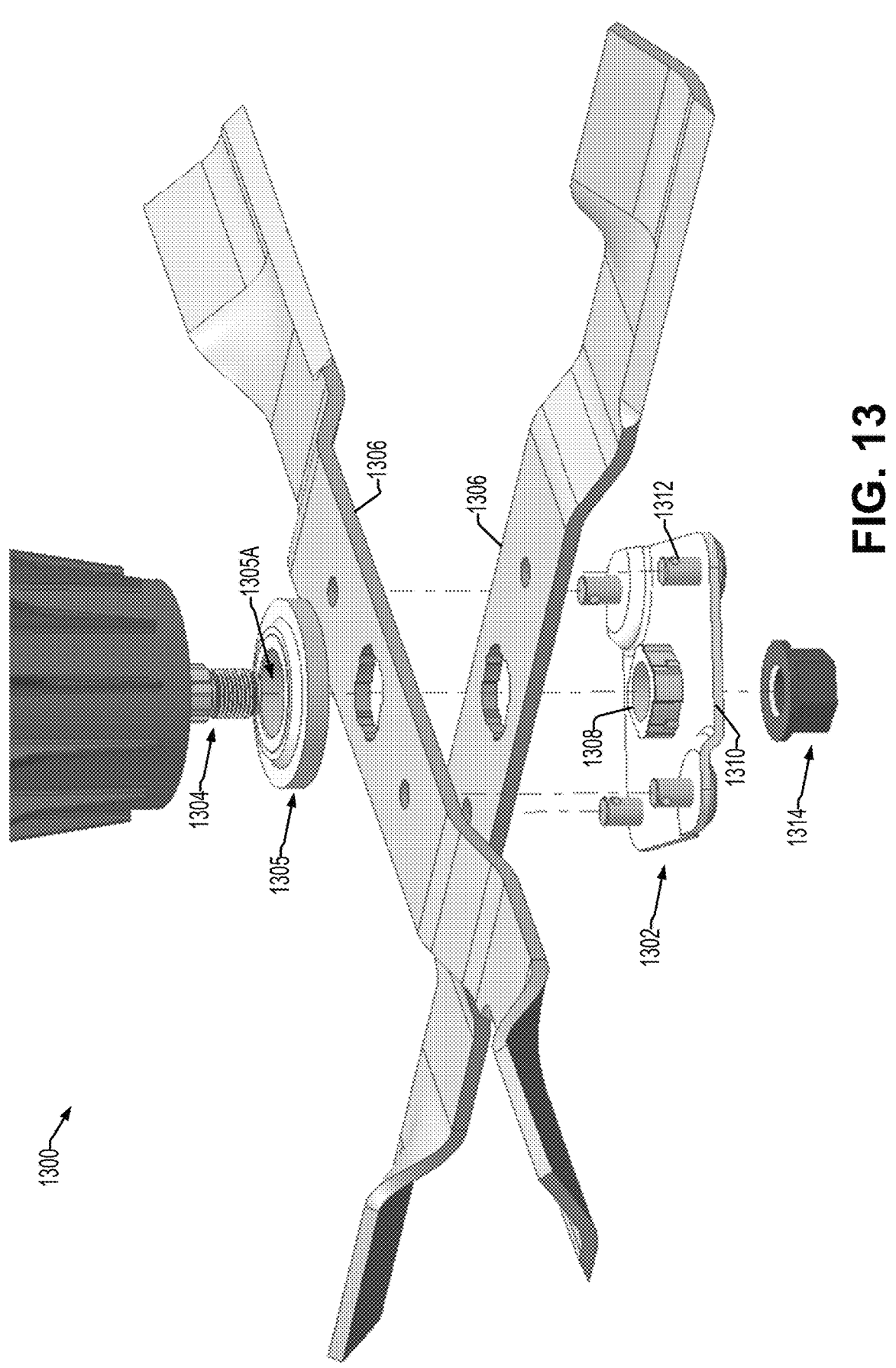
FIG. 13 illustrates an exploded view of an example multi-blade cutter assembly showing a second embodiment of a multi-blade adapter, according to disclosed embodiments.

With reference now to FIG. 13, an exploded view of an example multi-blade cutter assembly 1300 is depicted showing a second example multi-blade adapter 1302, according to disclosed embodiments. In this example embodiment, mounting plate 1310 is situated beneath multiple blades 1306 and multi-blade cutter assembly 1300 can include a top spacer 1305 situated above the multiple blades 1306. In the embodiment depicted by FIG. 13, mounting plate 1310 displaces base disk 924 as shown in FIG. 9. Multiple blade adapter 1302 can comprise centerpiece 1308, mounting plate 1310, and pins 1312, which are further detailed with reference to FIGS. 14A and 14B. In addition, top spacer 1305 can be similar to top spacer 606 or top spacer 1200 in some embodiments, though is not necessarily limited to the above descriptions thereof. Further, top spacer 1305 can include an inner surface 1305A matching an outer surface of centerpiece 1308 (e.g., which can be embodied by outer surface 906 in some embodiments), or matching an outer surface of shaft 1304 in further embodiments (e.g., as shown by grooves 909 of FIG. 10C, supra), or a combination of the foregoing in at least some embodiments. For example, an upper portion of inner surface 1305A can match the outer surface of shaft 1304 and a lower portion of inner surface 1305A can match the outer surface of centerpiece 1308.

Figure 14A:
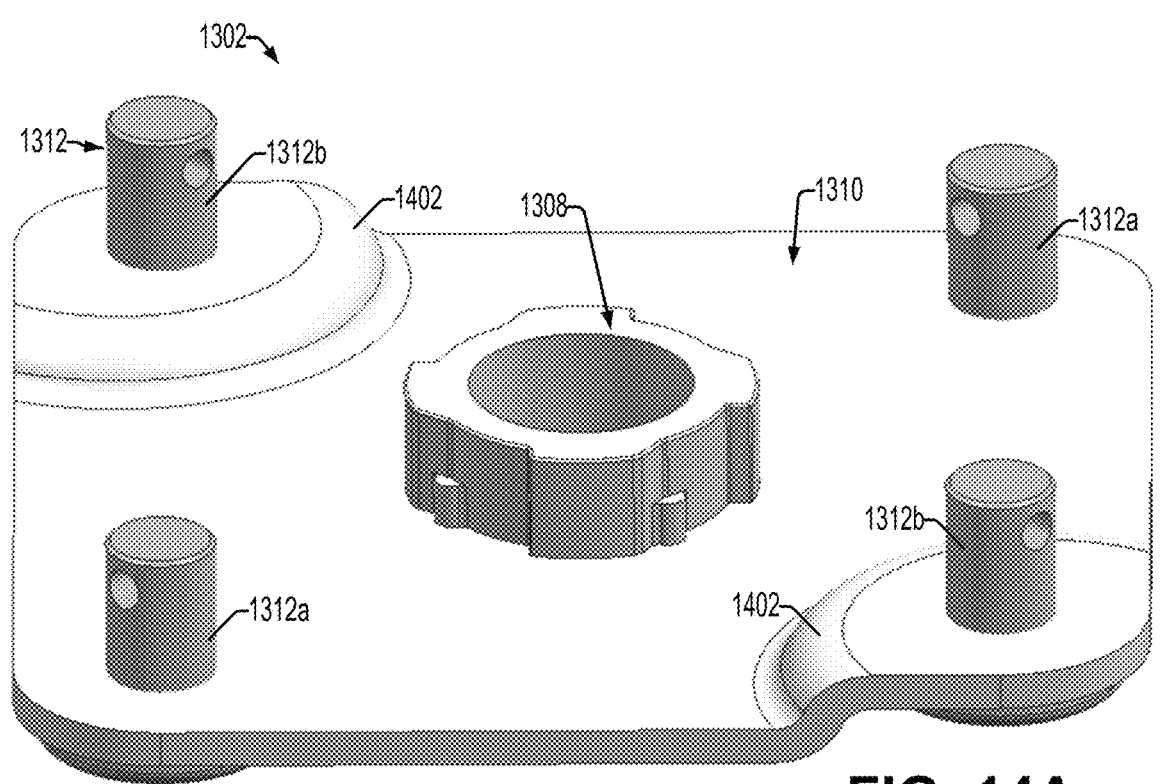
FIGS. 14A and 14B respectively illustrate an isometric view of the multi-blade adapter of FIG. 13, and a top view of the multi-blade adapter.
Figure 14B:
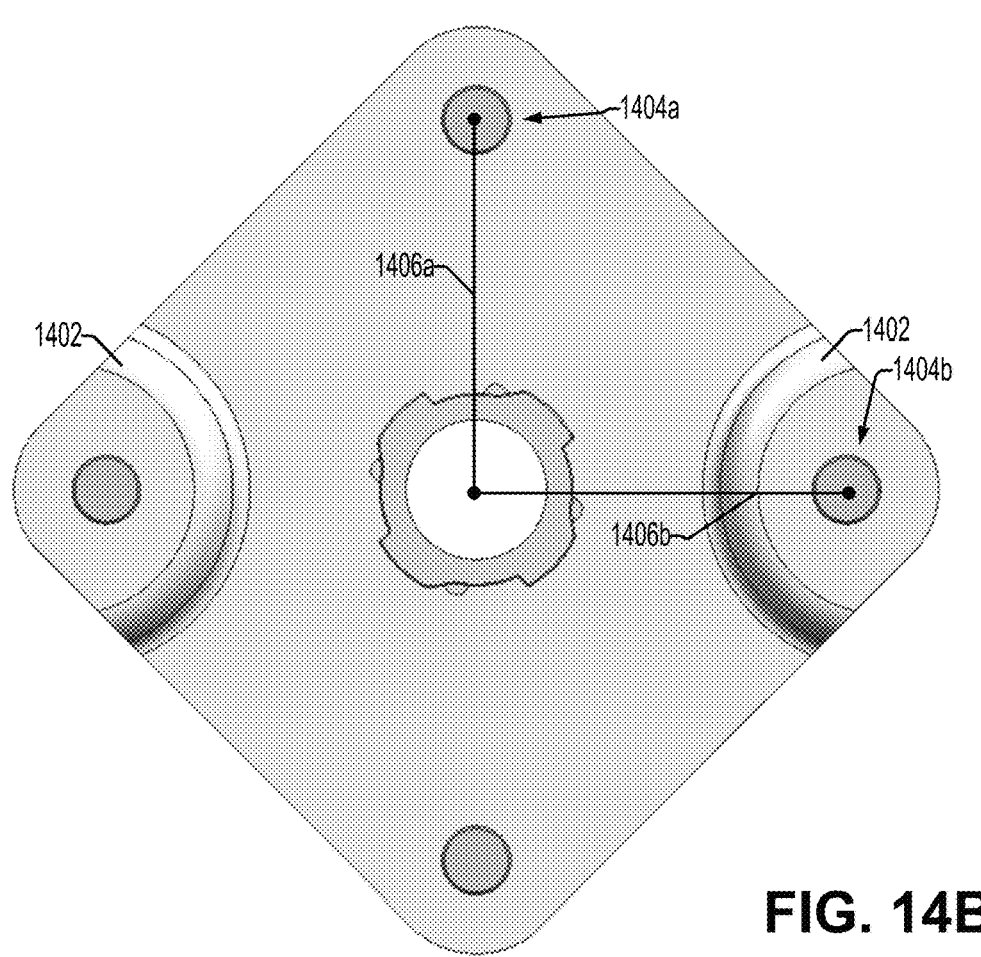

Turning now to FIGS. 14A and 14B, respectively illustrated are an isometric view of the second example multi-blade adapter 1302 and a top view of the second example multi-blade adapter 1302, according to disclosed embodiments. Multi-blade adapter 1302 can comprise centerpiece 1308, which can be substantially similar to and incorporate all or a portion of structure, design elements, and functionality of bottom spacer 608, bottom spacer 900, top spacer 606, or top spacer 1200 detailed supra. For example, centerpiece 1308 can comprise an inner surface (e.g., inner surface 904) configured to couple to a shaft (e.g., shaft 1304) of an outdoor power equipment motor and an outer surface (e.g., outer surface 906) configured to couple to multiple cutting blades (e.g., multiple blades 1306). The outer surface can comprise asymmetric buttresses (e.g., asymmetric buttresses 908) and dimples (e.g., dimples 926), as previously detailed.

Additionally, multi-blade adapter 1302 can comprise mounting plate 1310, which can be coupled to centerpiece 1308 or can be integrated with centerpiece 1308. Mounting plate 1310 can comprise pins 1312 configured to mate with apertures or cutouts of the multiple cutting blades. Pins 1312 are on opposing sides of mounting plate 1310 are paired, such that each pair 1312a or 1312b are coupled to a same blade of the multiple blades 1306, whereas adjacent pins 1312 couple to different blades of the multiple blades 1306.

As better viewed in the top view of FIG. 14B, pin(s) 1312a can be situated at a first location 1404a, having radius 1406a from an axis of rotation. Likewise, pin(s) 1312b can be situated at a second location 1404b, having radius 1406b from the axis of rotation. In some embodiments, radiuses 1406a and 1406b can be the same, giving mounting plate 1310 a square shape, whereas in other embodiments radiuses 1406a and 1406b can differ, in which case, mounting plate 1310 can have a rhomboid shape. Such can be a function of the implementation. For example, in embodiments in which the blades have different structure or dimensions, pin apertures (e.g., see 1104 of FIG. 11) can be in different locations on the different blades, which is set by corresponding pin locations 1404.

As discussed previously, pin locations 1404 can correspond to an area of a corresponding blade that is determined to have no transitions resulting from a forming process. Such can provide increased security and integrity. As discussed, pins 1312 can help distribute load from high energy impact events, such as what occurs during the stake test.

Multi-blade adapter 1302 can further comprise at least one dais 1402. Dais 1402 can raise a height level of pins 1312b relative to pins 1312a. Hence, a first installed blade (e.g., in order) mates with pins 1312a and does not interface with dais 1402 or pins 1312b. However, a second installed blade is seated atop the first installed blade. Thus, the second installed blade can rest on dais 1402 and mate with pins 1312b. In some embodiments, a height of dais 1402 can correspond to a thickness of the first installed blade.

Figures 15A, 15B:
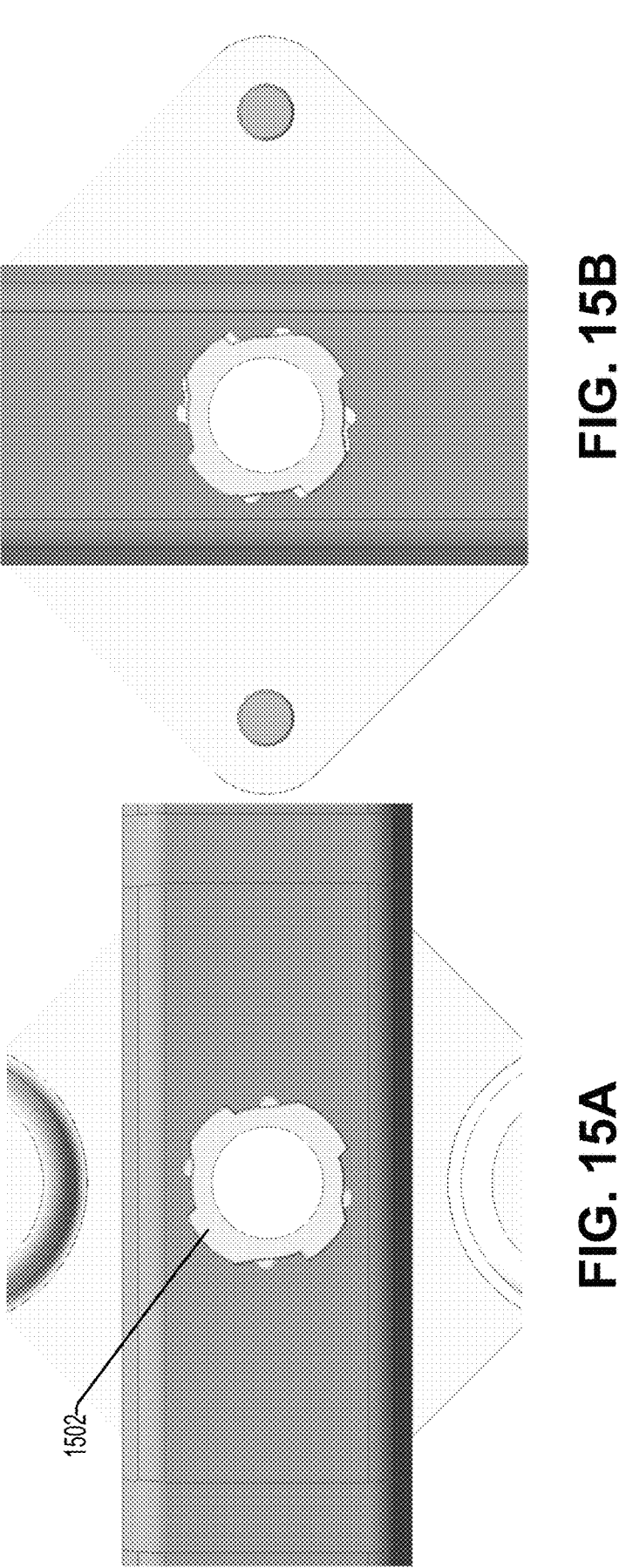
FIGS. 15A and 15B respectively illustrate a top view with respect to attachment of a first blade and a top view with respect to attachment of a second blade, according to disclosed embodiments.

FIGS. 15A and 15B respectively illustrate a top view with respect to attachment of a first blade and a top view with respect to attachment of a second blade, according to disclosed embodiments. As can be seen, when a given blade is aligned correctly with multi-blade adapter 1302, cutout apertures of the blade properly mate with centerpiece 1308. For example, asymmetric buttress 1502, which can be substantially similar to asymmetric buttress 908, can ensure that the blade is oriented properly, or the blade cutouts will not mate correctly with asymmetric buttresses 1502.

Figure 16:
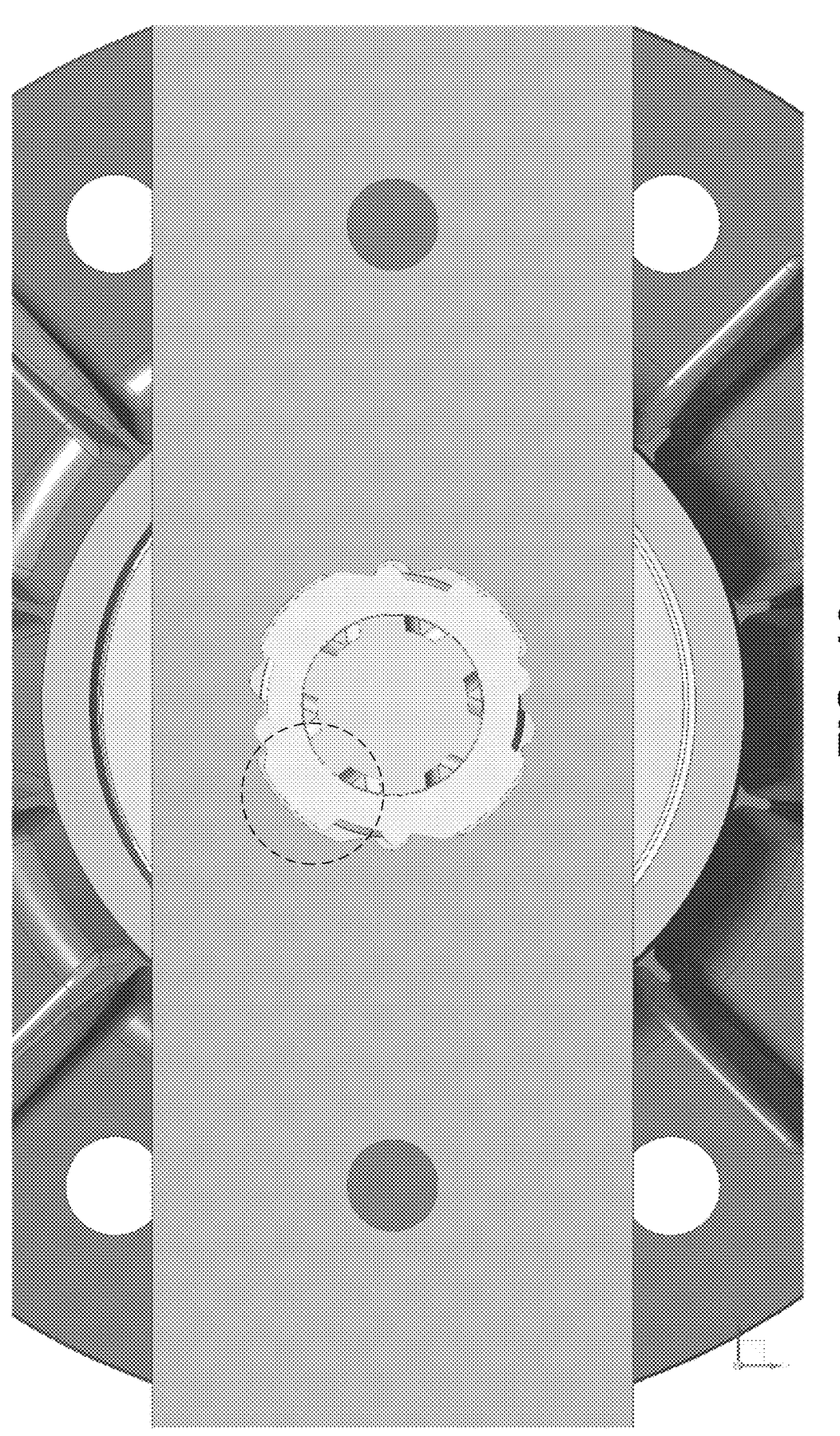
FIG. 16 illustrates an example of attaching a blade in an improper orientation, according to disclosed embodiments.

FIG. 16 illustrates an example of attaching a blade in an improper orientation, according to disclosed embodiments. For example, if a blade is installed upside-down, then the design of centerpiece 1308 such as the asymmetric buttresses can prevent such an improper installation on multi-blade adapter 1302.

Figure 17A:
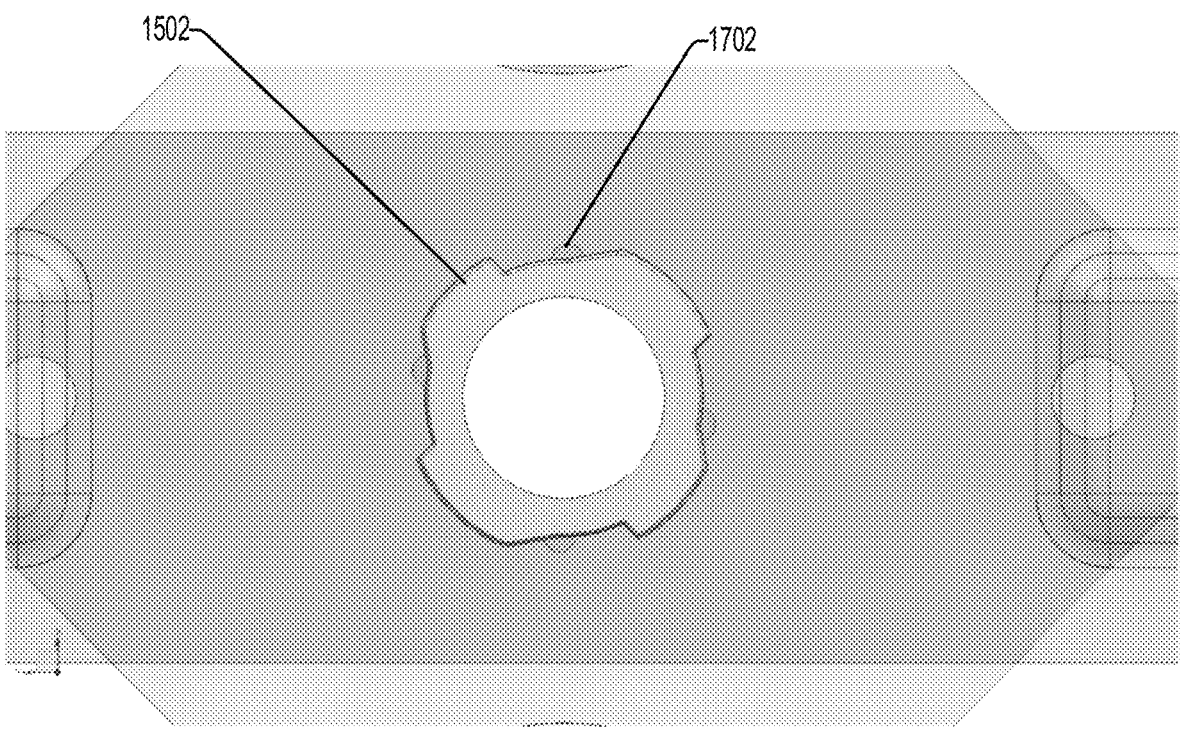
FIGS. 17A and 17B respectively illustrate a top view of blade installation with respect to dimples situated on the centerpiece and a side view of blade installation, according to disclosed embodiments.
Figure 17B:
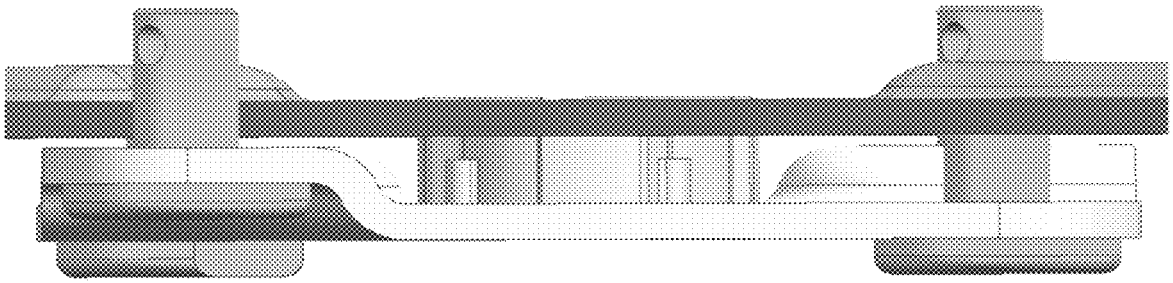

FIGS. 17A and 17B respectively illustrate a top view of blade installation with respect to dimples situated on the centerpiece and a side view of blade installation, according to disclosed embodiments. If upper and lower blades need to be differentiated, then cutouts can be varied between the upper and lower blades. For example, the lower blade can include a cutout to slide past dimple 1702, whereas the upper blade can exclude this element from the cutout. Thus, the upper blade cannot be attached prior to the lower blade and/or the upper blade must be seated above the lower blade, as ensured by dimple 1702. While both blades can clear asymmetric buttresses 1502 (provided, as here, the blades are oriented properly), without the cutout for dimple 1702 in the upper blade, the upper blade will not be able to seat down on multi-blade adapter 1302, indicating that the ordering of blade installation was improper.

Figure 18:
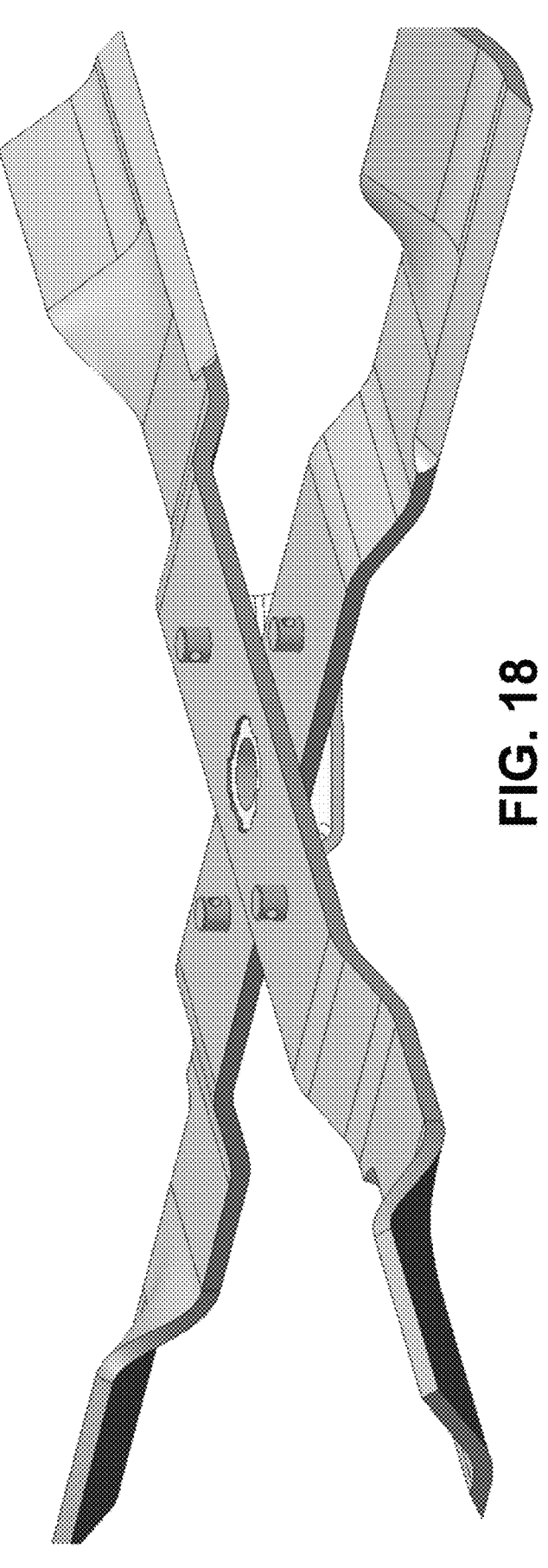
FIG. 18 illustrates an example of pre-aligning the multiple blades before installation, according to disclosed embodiments.

FIG. 18 illustrates an example of pre-aligning the multiple blades before installation, according to disclosed embodiments. In other words, multi-blade adapter 1302 can be configured to properly align multiple blades 1306 before mounting to the outdoor power equipment. For example, it can be ensured that multiple blades 1306 have the proper orientation and are seated in the proper order. Hence, multi-blade adapter 1302 can be designed such that multiple blades 1306 can be stacked and correctly oriented, prior to installation under the deck of the outdoor power equipment.

With reference now to FIG. 19, a third example multi-blade adapter 1902 is illustrated, according to disclosed embodiments. In this example embodiment, mounting plate 1904 is situated above the multiple blades 1908 as opposed to mounting plate 1310 of FIG. 13, which is situated below multiple blades 612. Distinct from the square or rectangle shape of mounting plate 1310, mounting plate 1904 has a cross shape. Moreover, mounting plate 1904 couples to the multiple blades 1908 via bolts 1906 and associated nuts (better viewed with reference to FIG. 20).

In this example embodiment, radius 1910a of bolt 1906a, which couples to upper blade 1908a, is markedly longer than radius 1910b of bolt 1906b that couples to lower blade 1908b. As depicted, locations of bolts 1906 can correspond to associated apertures formed in blades 1908, and the associated locations of those elements can correspond to locations of the blades 1908 that are free of transitions resulting from a blade-forming process.

Furthermore, whereas mounting plate 1310 was detailed comprising one or more dais 1402 elements to offset the junctions (e.g., in terms of elevation) between upper and lower blades, mounting plate 1904 can comprise one or more alternating inclines 1912 and declines 1914. In this example, incline 1912 can interface with upper blade 1908a and decline 1914 can interface with lower blade 1908b.

Figure 20:
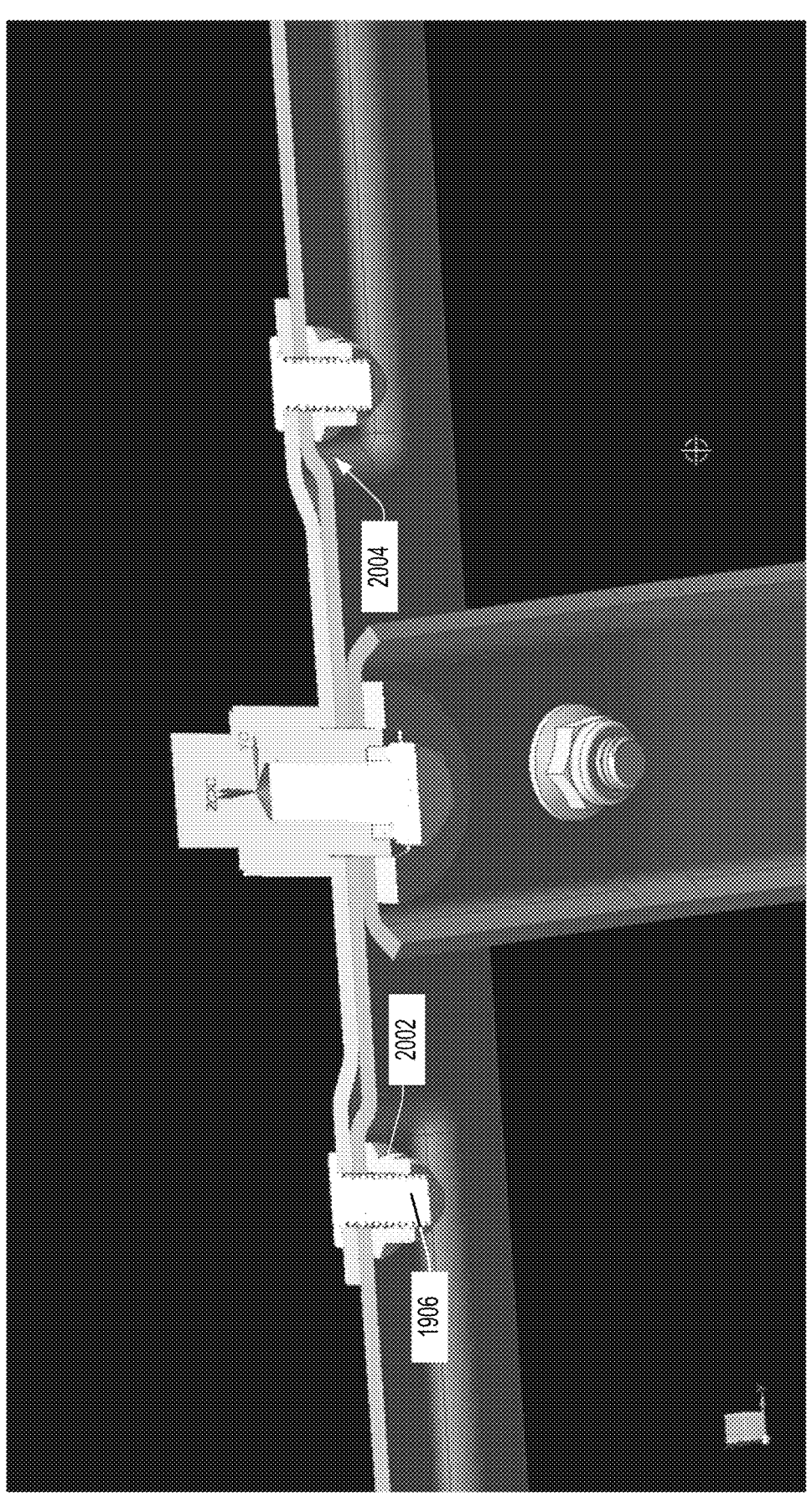
FIG. 20 illustrates a cross section view of the multi-blade adapter of FIG. 19 cut at the axis of rotation, according to disclosed embodiments.

FIG. 20 illustrates a cross section view of the multi-blade adapter 1902 cut at the axis of rotation, according to disclosed embodiments. As can be seen, bolts 1906 can have threads that mate to corresponding nut 2002. As shown in FIG. 19, radius 1910a is significantly longer than radius 1910b. In this implementation, as can be seen here in FIG. 20, upper blade 1908a has a transition region 2004, where upper blade 1908a is formed to have a contour. Thus, radius 1910a is sufficient to avoid this transition region in the location of the associated bolt 1906 and corresponding aperture of upper blade 1908a.

Figure 21:
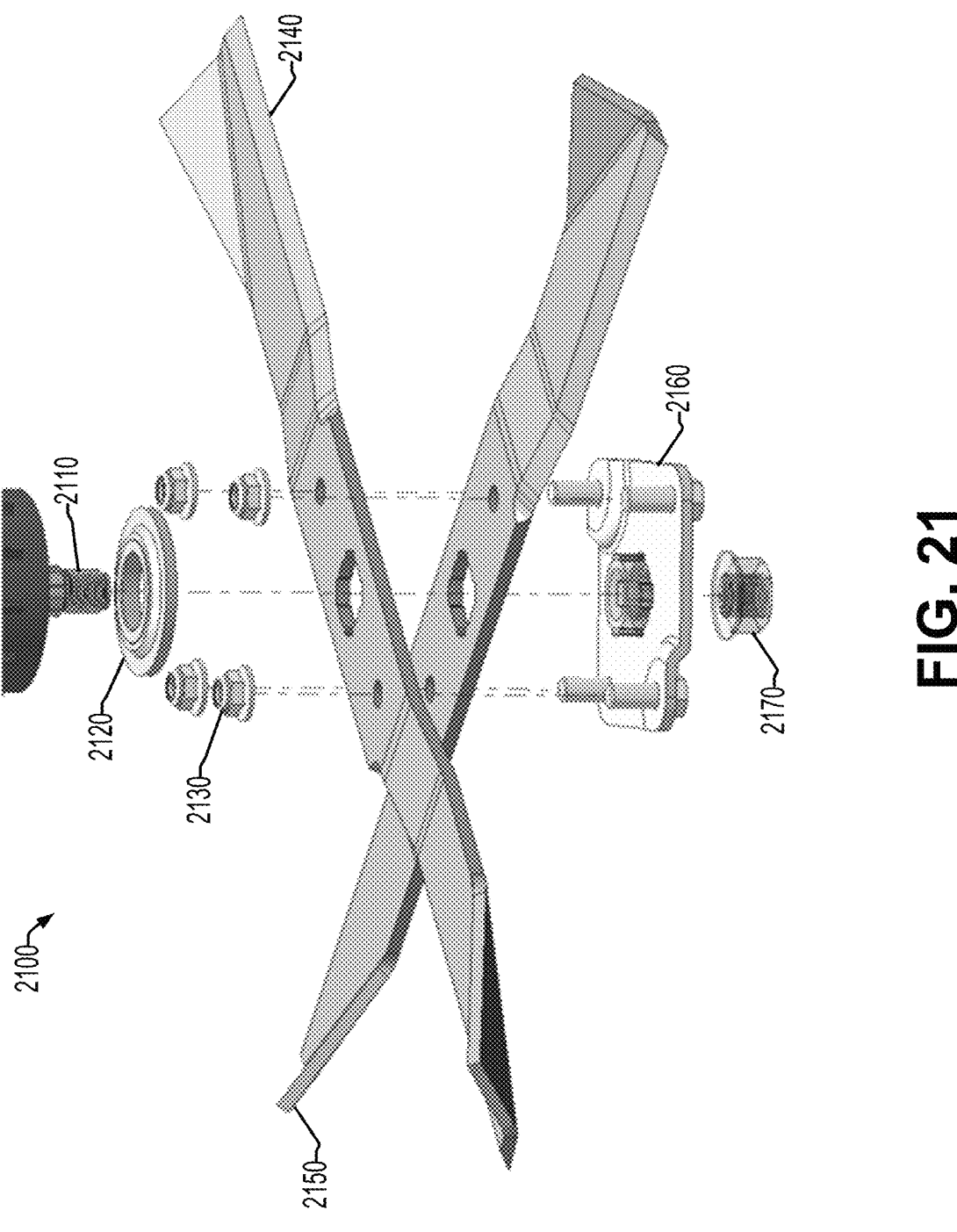
FIG. 21 shows a fourth embodiment of a multi-blade cutter assembly.
Figure 22:
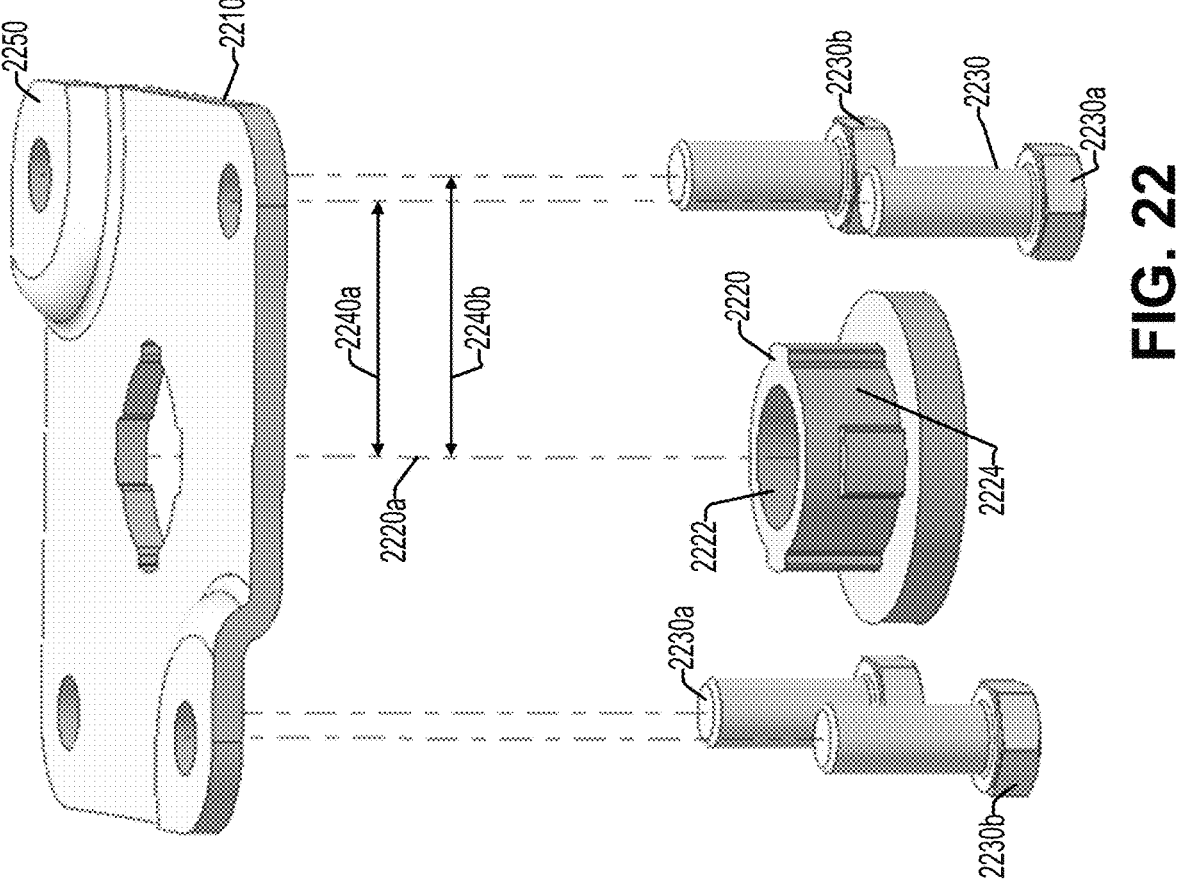
FIG. 22 shows an exploded perspective view of the multi-blade adapter of the multi-blade cutter assembly of FIG. 21.
Figure 23:
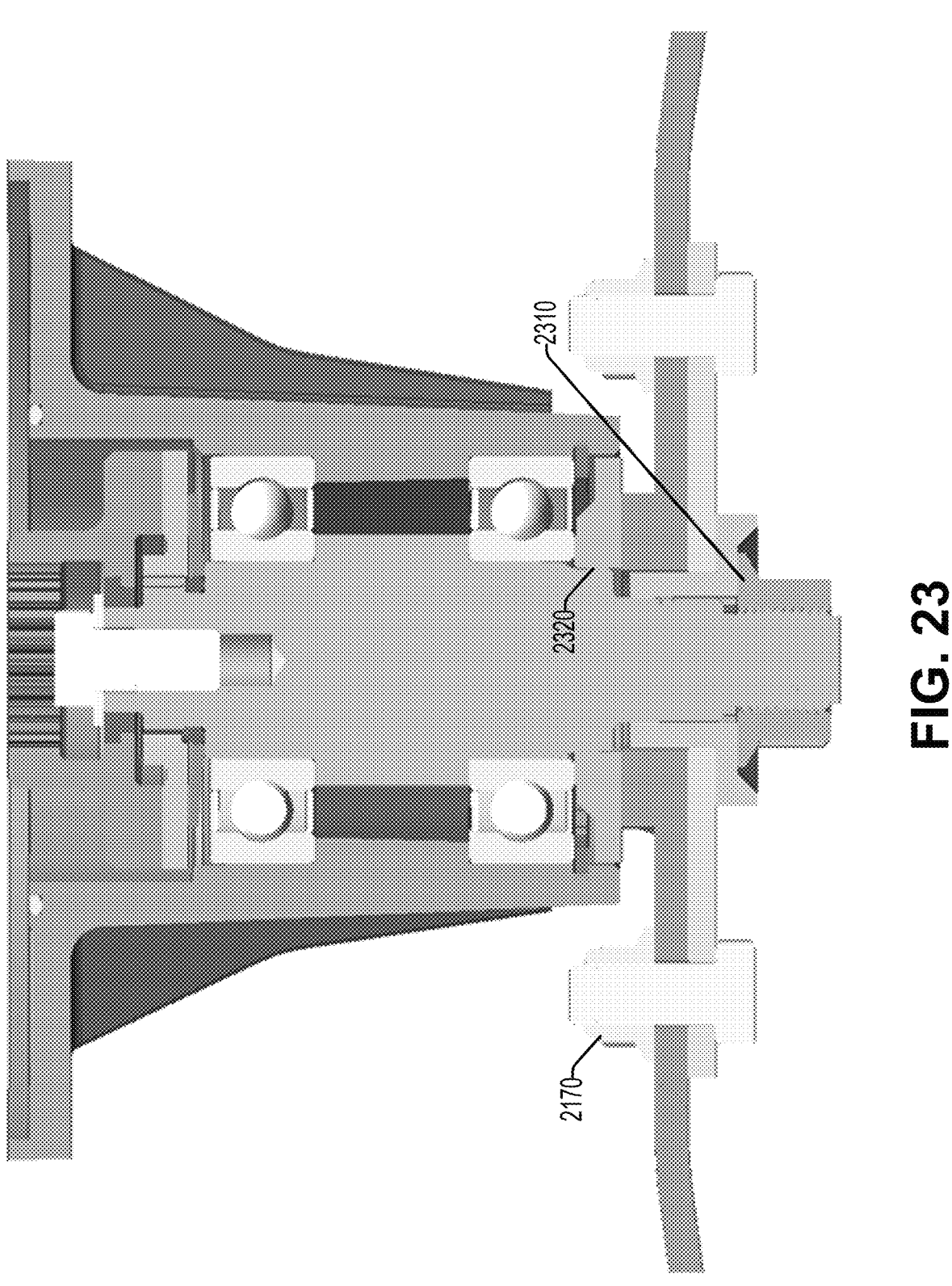
FIG. 23 shows a cross-section of the multi-blade cutter assembly of FIG. 21 assembled with an associated mowing machine.
Figure 26A:
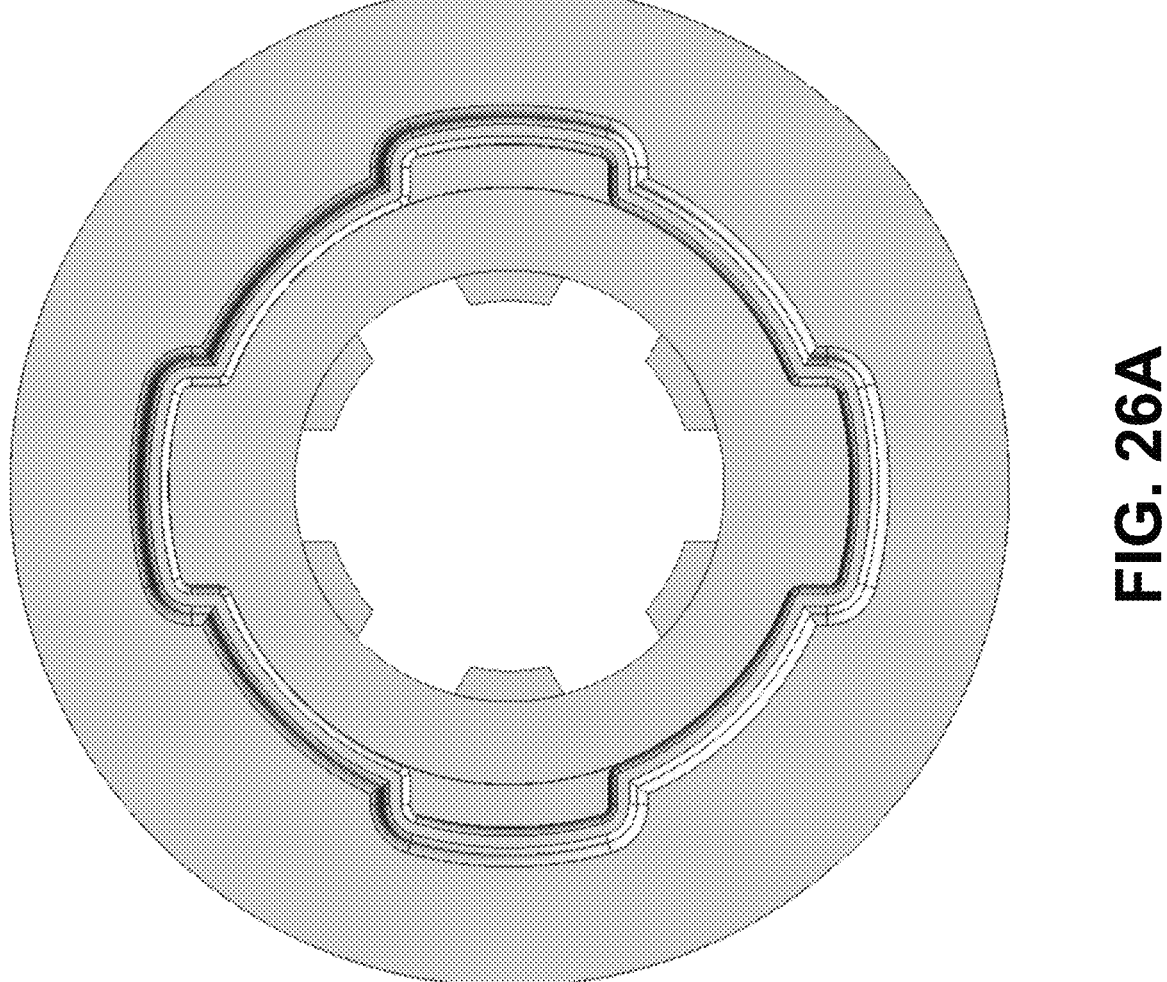
FIG. 26A shows a top view of the adapter hub of the multi-blade adapter of the multi-blade cutter assembly of FIG. 21.
Figure 26B:
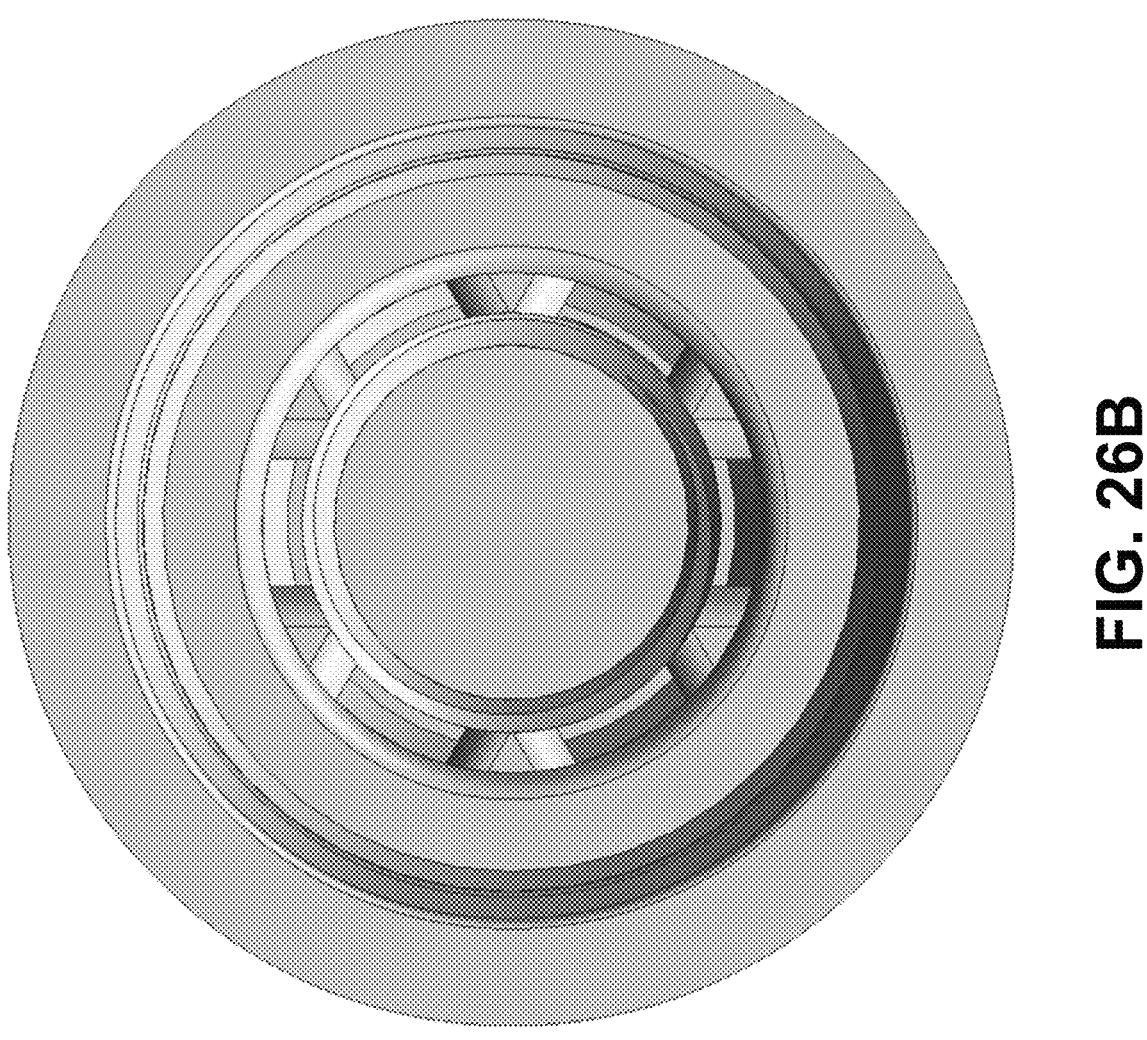
FIG. 26B shows an end view of the shaft of the associated mowing machine of FIG. 23 prior to assembly with the multi-blade cutter assembly of FIG. 21.
Figure 26C:
FIG. 26C shows an end view of the shaft of the associated mowing machine of FIG. 23 as assembled with the adapter hub of the multi-blade cutter assembly of FIG. 21.
Figure 27:
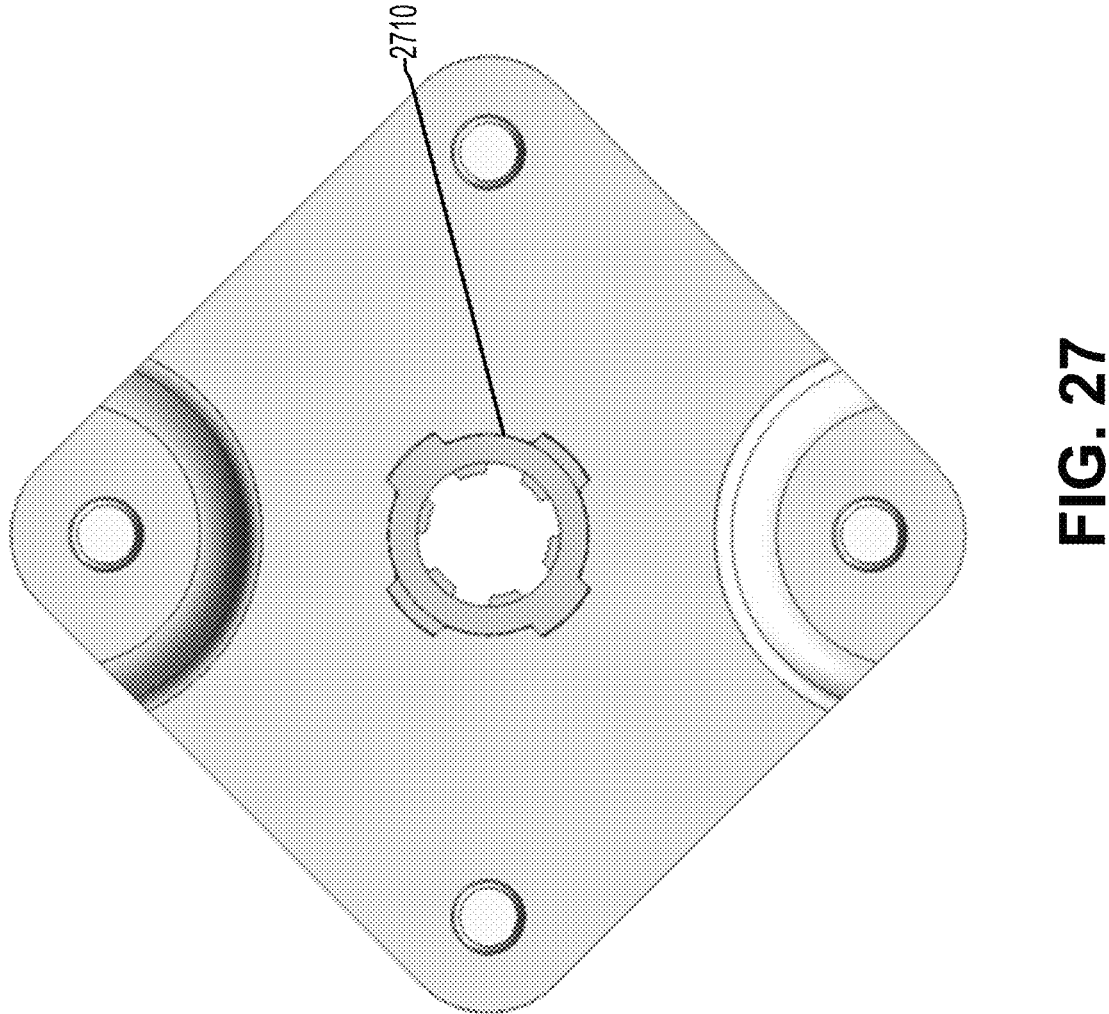
FIG. 27 shows a top view of the multi-blade adapter of the multi-blade cutter assembly of FIG. 21.
Figure 28:
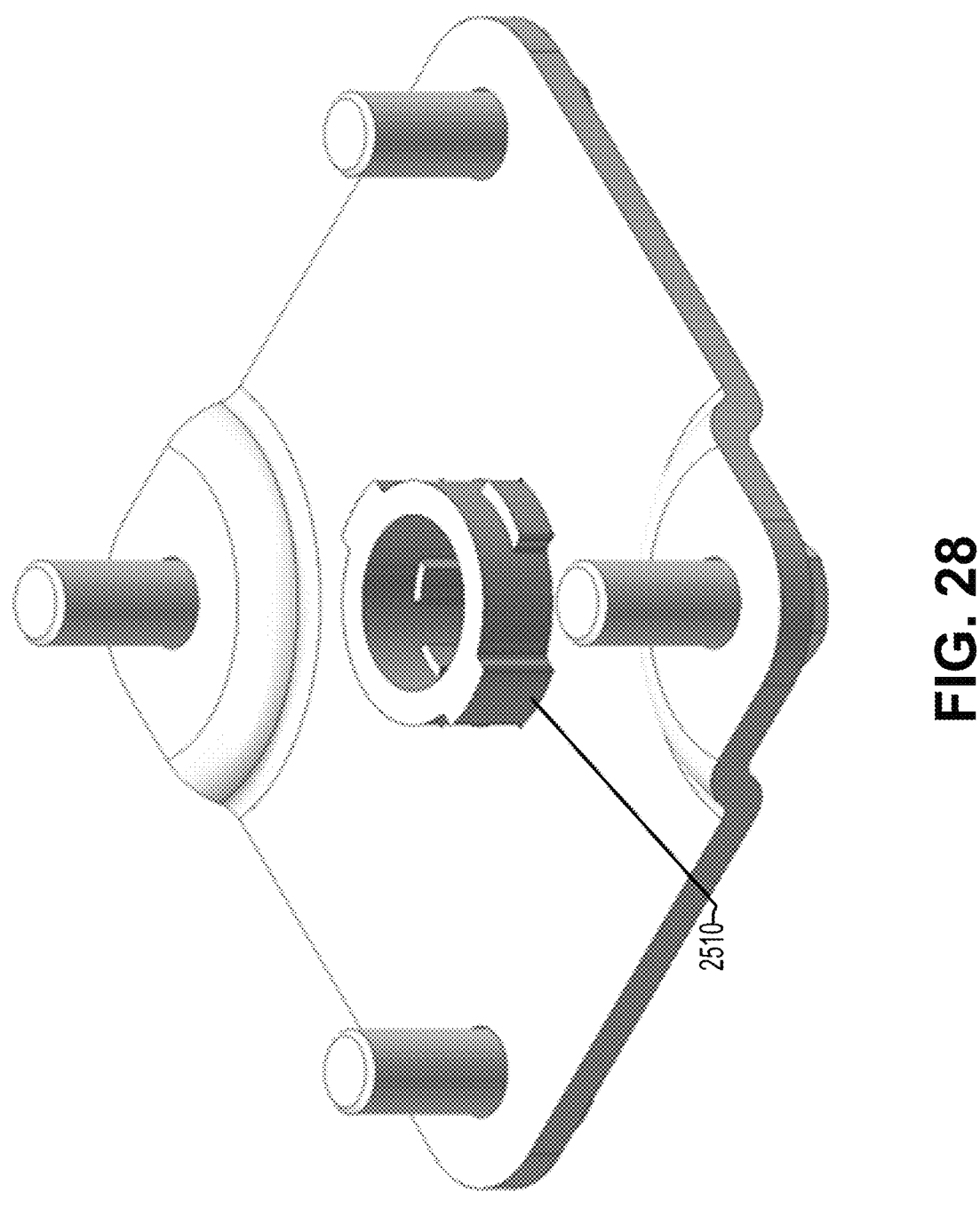
FIG. 28 shows a perspective view of the multi-blade adapter of the multi-blade cutter assembly of FIG. 21.
Figure 29:
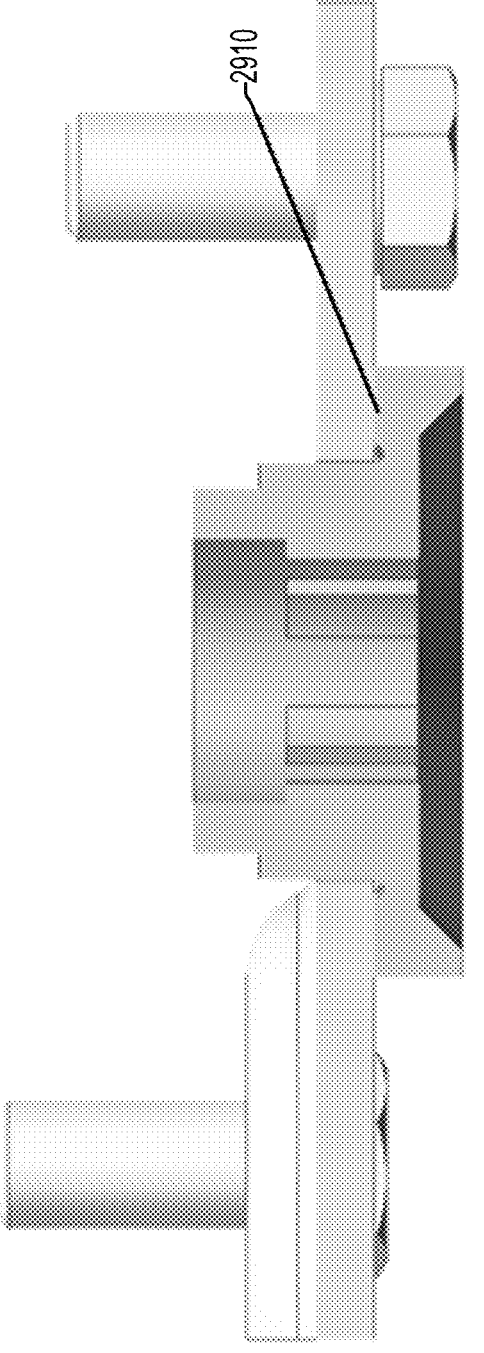
FIG. 29 shows a sectional view of the multi-blade adapter of the multi-blade cutter assembly of FIG. 21.

With reference now to FIGS. 21-33, an additional example multi-blade cutter assembly 2100 is depicted showing a multi-blade adapter 2160, according to disclosed embodiments. In this example embodiment, adapter plate 2210 is situated beneath multiple blades, top blade 2140 and top blade 2150, and multi-blade cutter assembly 2100 can include a top spacer 2120 situated above the multiple blades. Multiple blade adapter 2160 can comprise adapter hub 2220, adapter plate 2210, and clinch studs 2230, which are further detailed with reference to FIGS. 22-25. In addition, top spacer 2120 can be similar to top spacer 606 or top spacer 1200 or top spacer 1305 in some embodiments, though is not necessarily limited to the above descriptions thereof. Further, and with further reference to FIGS. 23 and 26B, top spacer 2120 can include an inner surface 2320 adapted to match an outer surface of an associated drive shaft or motor shaft or other work output shaft 2110 such as, and without limitation, that shown in FIG. 26B. As shown in FIGS. 21, 22, and 23, the top blade 2140 and bottom blade 2150 may each be operationally connected to the multiple blade adapter 2160 with nuts 2130 or nuts 2310 or nuts 2170 adapted for threaded engagement with the clinch studs 2230. It should be understood that in other equally acceptable embodiments the blades may be operationally engaged with other mechanical fastener arrangements such as bolts paired to female threaded fasteners engaged with the multiple blade adapter. Clinch studs or other fasteners chosen with good engineering judgement may be engaged with the adapter plate by press fit or welding or brazing or other operations chosen with good engineering judgment. With additional reference now to FIG. 27, the cutout 2710 is a hole in the adapter plate 2210 adapted to receive the adapter hub 2220, the adapter hub may be press fit into the cutout 2710 or engaged to the adapter plate by staking. With reference now to FIG. 29, it can be seen that in this embodiment the adapter hub 2220 has a shoulder 2910 which defines a physical limit against which the adapter plate 2210 seats as assembled.

With continued reference to FIG. 23, shown is a cross-section of the multi-blade adapter 2160 and blades engaged to a motor or other work output shaft 2110. In the embodiment shown the multi-blade adapter 2160 is mounted to the shaft 2110 by clamping it between a shaft shoulder and a mounting nut 2310 threaded to the end of the shaft 2110. With additional reference now to FIGS. 24, 25, 26A, 26B, 26C, shown are respectively a top view of the adapter hub 2220 showing a spline set 2410, a perspective view of adapter hub 2220, a top view of the adapter hub 2220 showing a spline set 2410, a bottom view of shaft 2110, and a bottom view of the shaft 2110 with the adapter hub 2220 mounted thereon in the arrangement depicted in FIG. 23. As is best shown in FIG. 26C the adapter hub 2220 is keyed to the shaft 2110 by spline set 2410 (and corresponding features on shaft 2110) so that the blades cannot slip relative to the shaft. This prevents the mounting nut 2310 from self-tightening.

Figure 24:
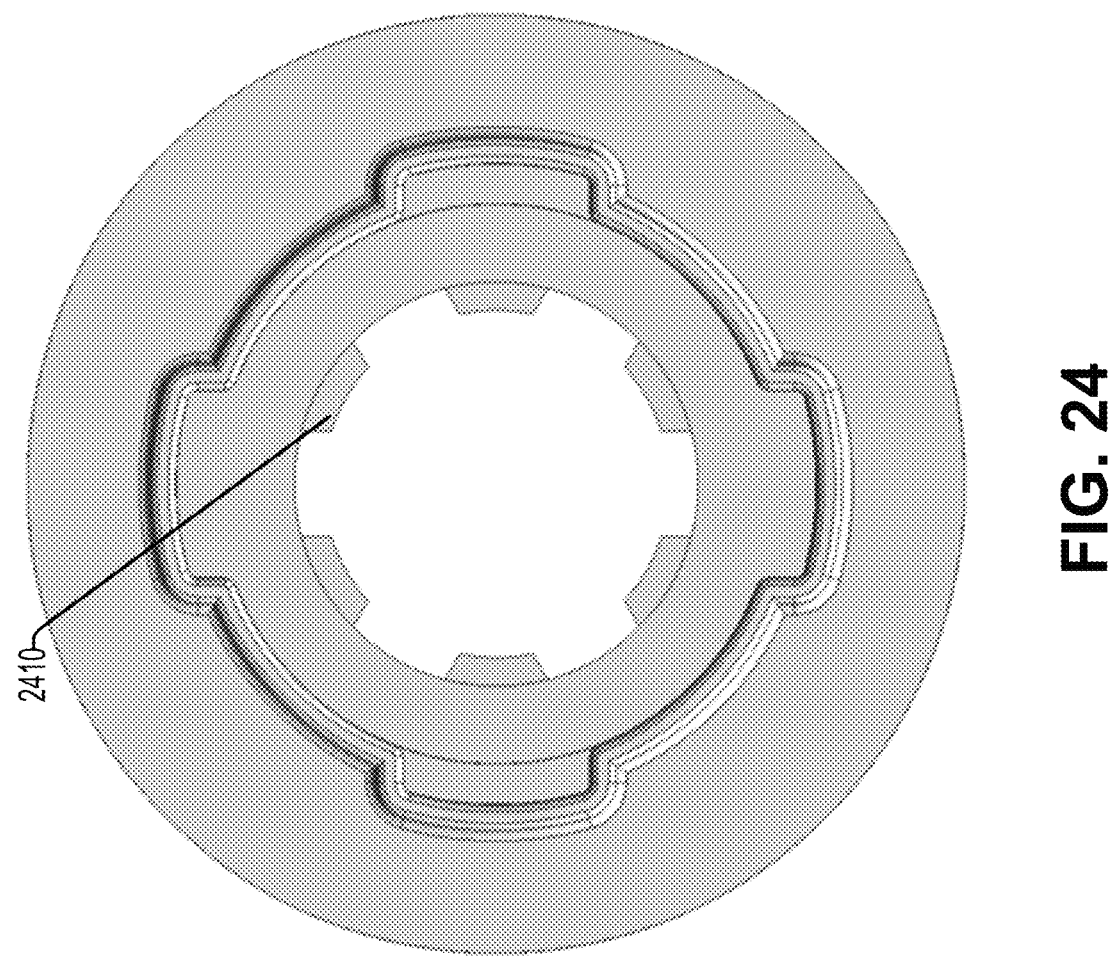
FIG. 24 shows a top view of the adapter hub of the multi-blade adapter of the multi-blade cutter assembly of FIG. 21.
Figure 25:
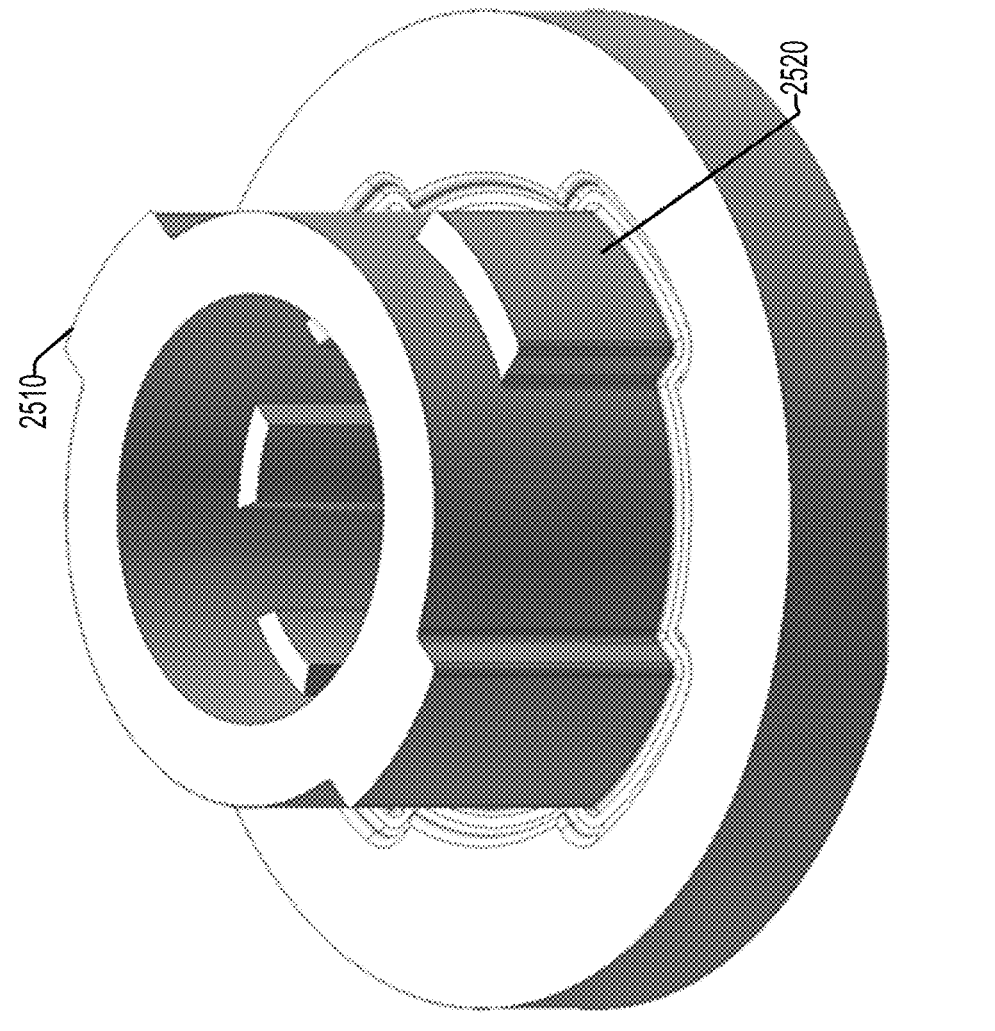
FIG. 25 shows a perspective view of the adapter hub of the multi-blade adapter of the multi-blade cutter assembly of FIG. 21.

Turning now to FIGS. 24 and 25, respectively illustrated are a top view of the adapter hub 2220 from the multi-blade adapter 2160 and a perspective view of the adapter hub 2220 from the multi-blade adapter 2160, according to disclosed embodiments. Multi-blade adapter 2160 can comprise adapter hub 2220, which can be substantially similar to and incorporate all or a portion of structure, design elements, and functionality of bottom spacer 608, bottom spacer 900, top spacer 606, or top spacer 1200 detailed supra. For example, adapter hub 2220 can comprise an inner surface 2222 (c.f., inner surface 904) configured to couple to a shaft (e.g., shaft 2110) of an outdoor power equipment motor and an outer surface 2224 (c.f., outer surface 906) configured to couple to multiple cutting blades (e.g., top blade 2140 and bottom blade 2150). The outer surface can comprise a buttress 2510 and a buttress 2520 (c.f., asymmetric buttresses 908) and, optionally, dimples (e.g., dimples 926), as previously detailed. It should be noted that in the embodiment shown in FIGS. 24-25, the buttress 2510 extends the full height of the adapter hub 2220 while the buttress 2520 does not extend the full height of the adapter hub 2220 so that the perimeter defined by the outer surface 2224 of the adapter hub varies with height along the adapter hub.

Additionally, multi-blade adapter 2160 can comprise adapter plate 2210, which can be coupled to adapter hub 2220 or can be integrated with adapter hub 2220. Adapter plate 2210 can comprise clinch studs 2230 configured to mate with apertures or cutouts of the multiple cutting blades. Clinch studs 2230 on opposing sides of adapter plate 2210 are paired, such that pair 2230a is coupled to a same blade of the multiple blades (top blade 2140 or bottom blade 2150 in this embodiment), and pair 2230b is coupled to a same blade of the multiple blades (top blade 2140 or bottom blade 2150 in this embodiment) whereas adjacent clinch studs 2230 couple to different blades of the multiple blades.

Similar to that shown in FIG. 14B above, the clinch studs 2230 of clinch stud pair 2230a can each be situated at a first offset 2240a from the center axis 2220a of the adapter hub 2220. Likewise, clinch studs 2230 of clinch stud pair 2230b can each be situated at a second offset 2240b from the center axis 2220a of the adapter hub 2220. In some embodiments, first offset 2240a and second offset 2240b can be the same, giving adapter plate 2210 a square shape.

As with previously discussed embodiments, multi-blade adapter 2160 can further comprise at least one dais 2250. Dais 2250 can raise a height level of clinch studs 2230b relative to clinch studs 2230a. Hence, a first installed blade, bottom blade 2150, mates with clinch studs 2230a and does not interface with dais 2250 or clinch studs 2230b. However, a second installed blade, top blade 2140, is seated atop the first installed blade 2150. Thus, the second installed blade, top blade 2140, can rest on dais 2250 and mate with clinch studs 2230b. In some embodiments, a height of dais 2250 can correspond to a thickness of the first installed blade.

Figure 30:
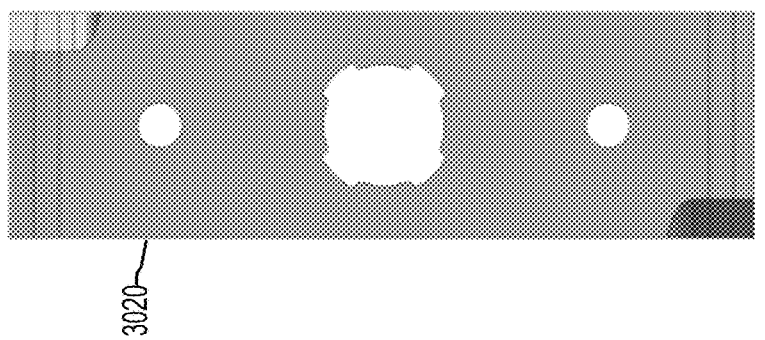
FIG. 30 shows an embodiment of a set of blades
Figure 30:
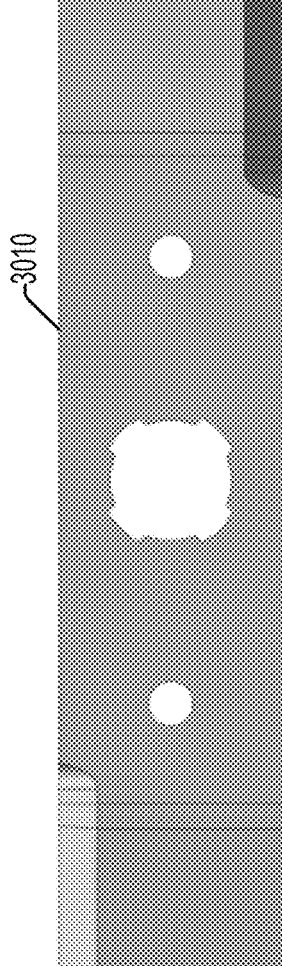

FIG. 30 shows a set of blades with a first blade 3010 and a second blade 3020 having the same cutout 3030 to accommodate the adapter hub 2220. Because the cutout 3030 is the same in each blade, they can be interchanged in installation without assembly issues.

Figure 31:
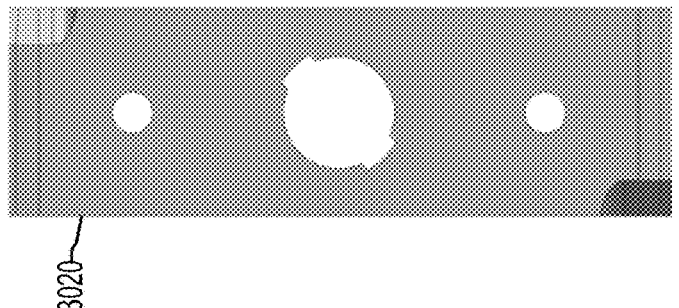
FIG. 31 shows an embodiment of a set of blades.
Figure 31:
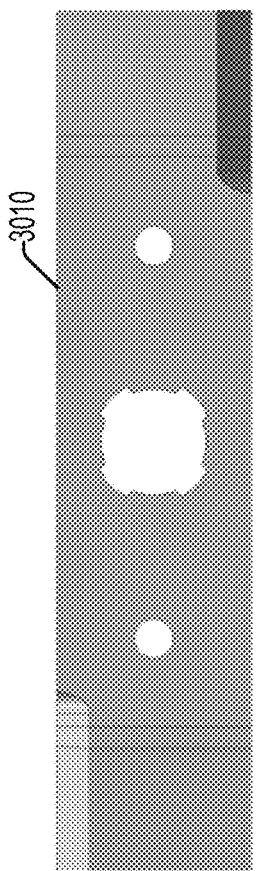

By contrast with the blades in FIG. 30, the blades in FIG. 31 differ from one another. FIG. 31 shows a set of blades with a first blade 3110 and a second blade 3120. First blade 3110 has a cutout 3130a and second blade 3120 has a cutout 3130b. Cutout 3130a differs from cutout 3130b such that an 3130a is the larger cutout such that all objects that will pass through 3130b will also pass through 3130a but there are objects that will pass though 3130a that will not also pass through 3130b. More specifically, cutout 3130a is adapted to accommodate buttress 2510 and buttress 2520 while cutout 3130b is adapted to accommodate buttress 2510 but not buttress 2520. As such, because cutouts 3130a and 3130b differ, the blade cannot be interchanged in installation without assembly issues.

Figure 32:
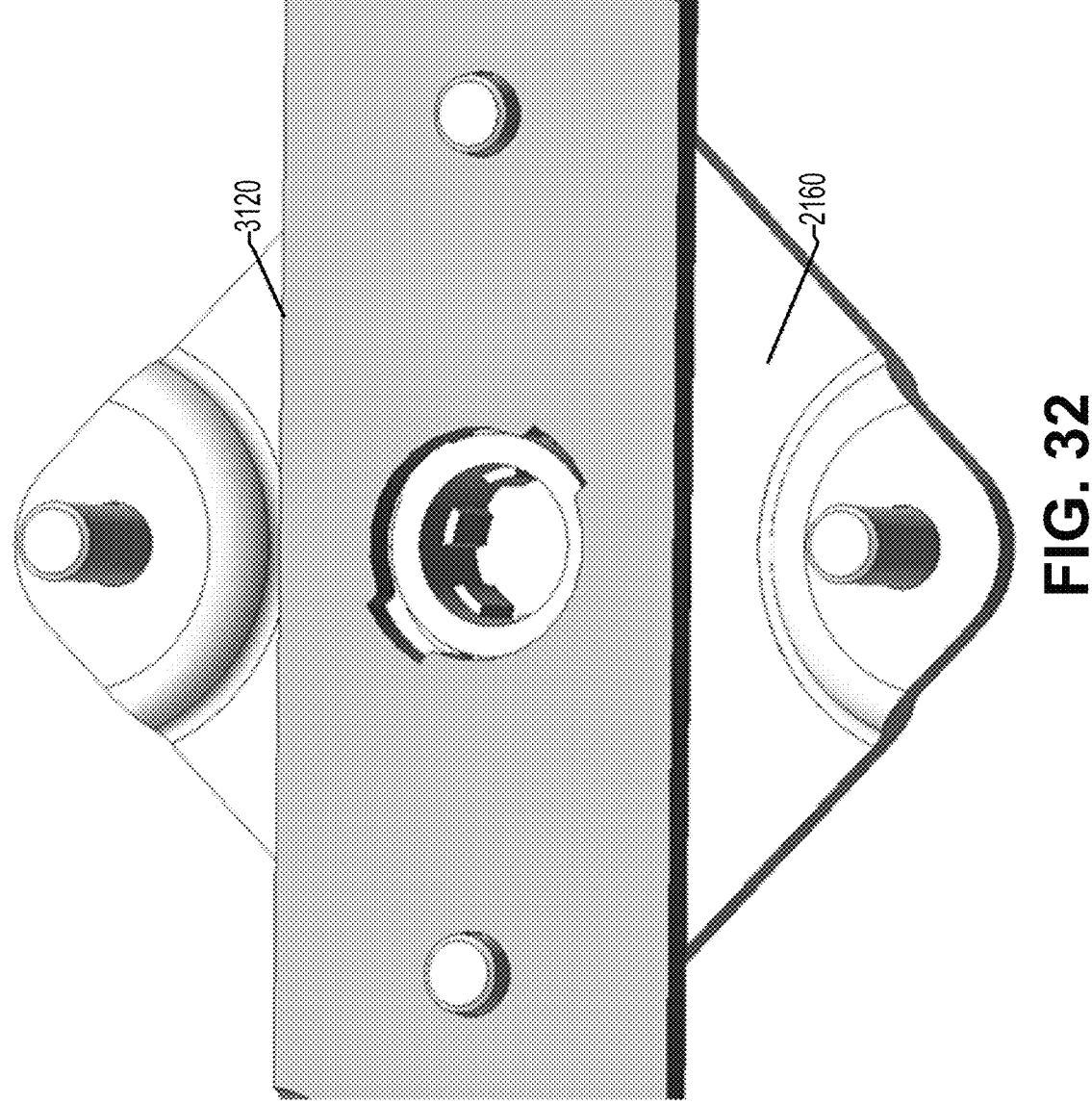
FIG. 32 shows an incorrect blade-adapter assembly.
Figure 33:
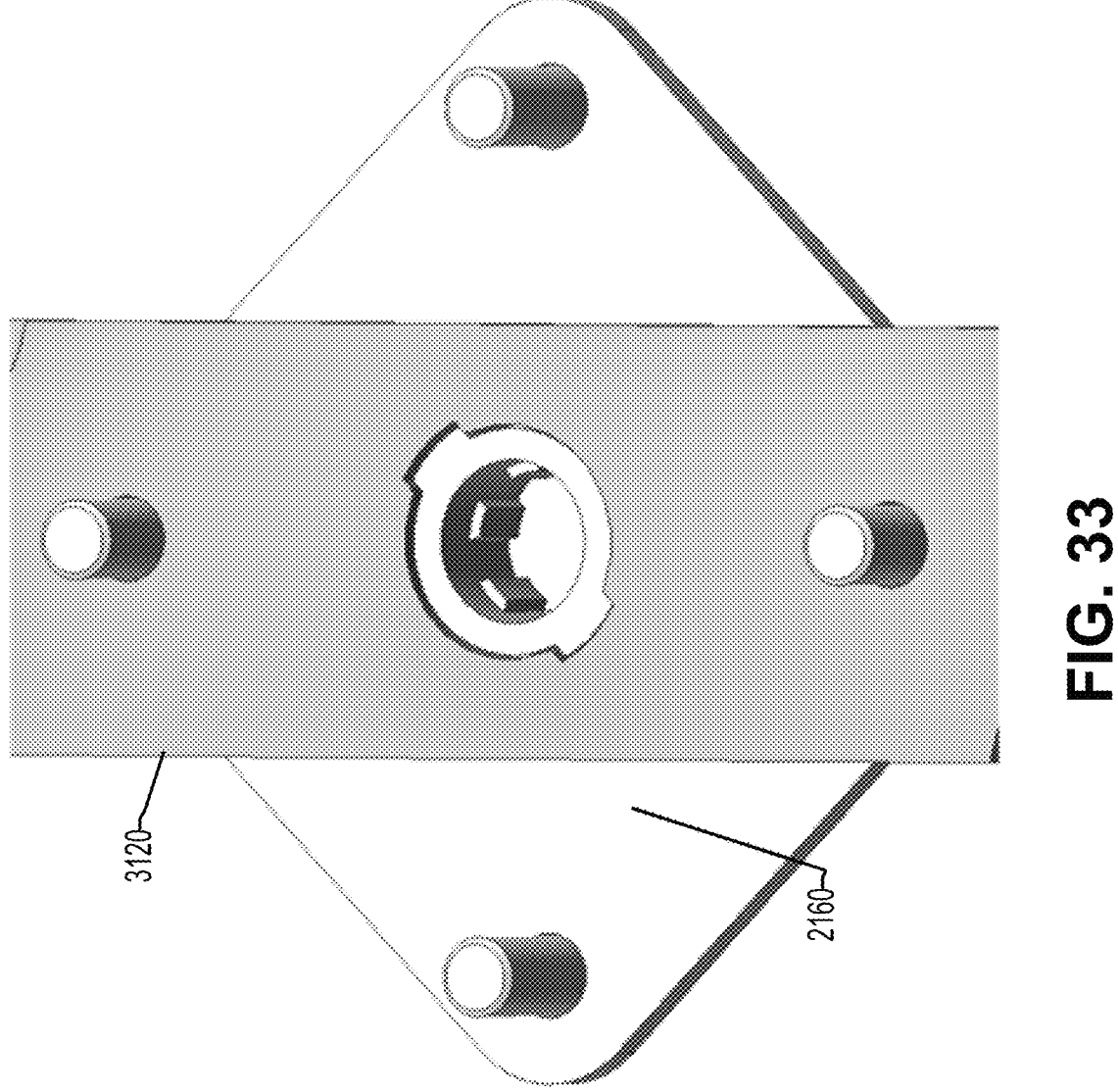
FIG. 33 shows a correct blade-adapted assembly.

Referring now to FIGS. 32 and 33, shown are assembly attempts with blade 3120 and multi-blade adapter 2160. In FIG. 32, blade 3120 is positioned improperly and cannot be properly seated on the multi-blade adapter 2160 because buttress 2520 is blocking it from being moved further down on the adapter hub 2220. In FIG. 33, blade 3120 is positioned properly and is properly seated on the multi-blade adapter 2160.

Figure 34:
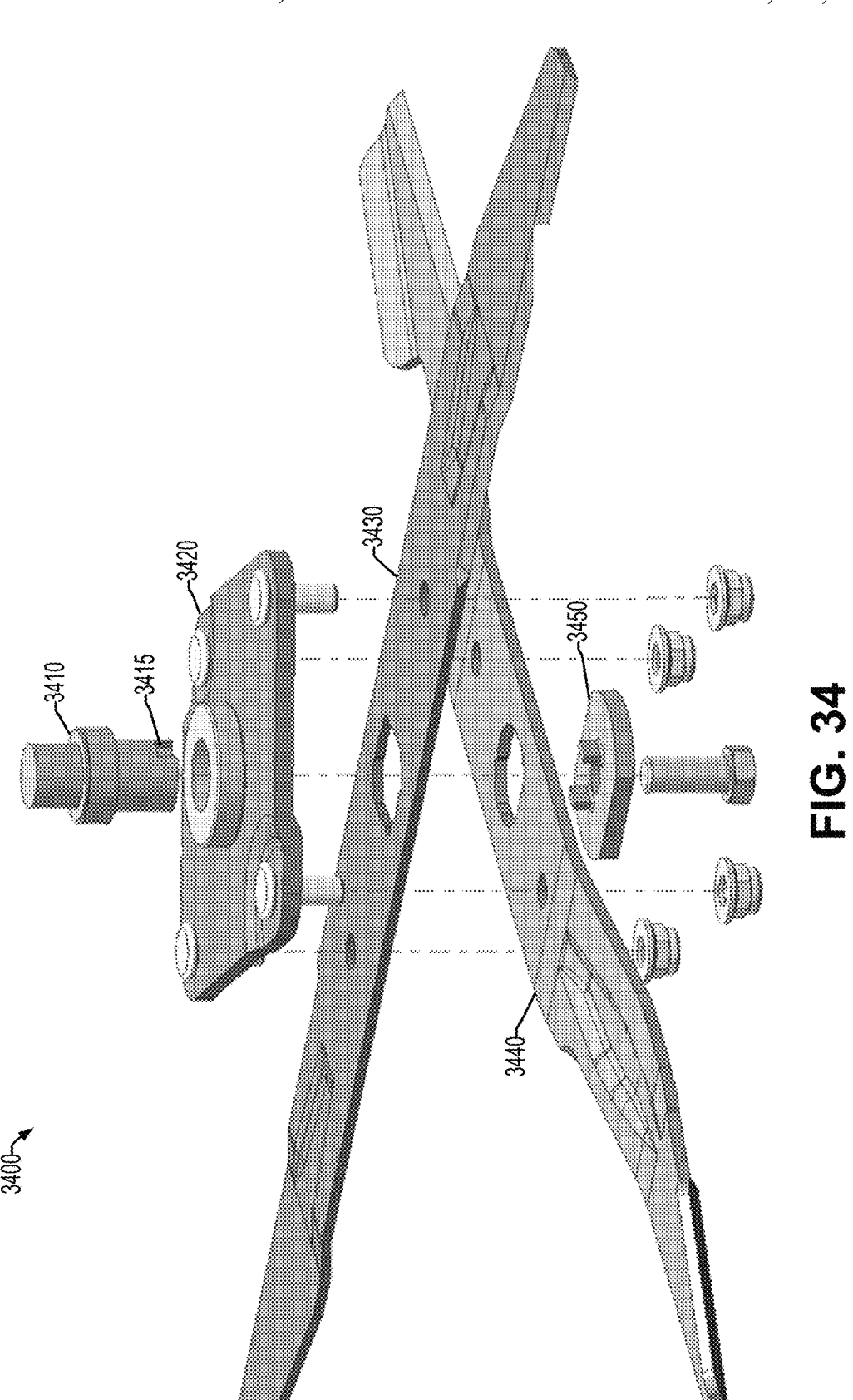
FIG. 34 shows an exploded view of a fourth embodiment of a multi-blade cutter assembly.
Figure 35:
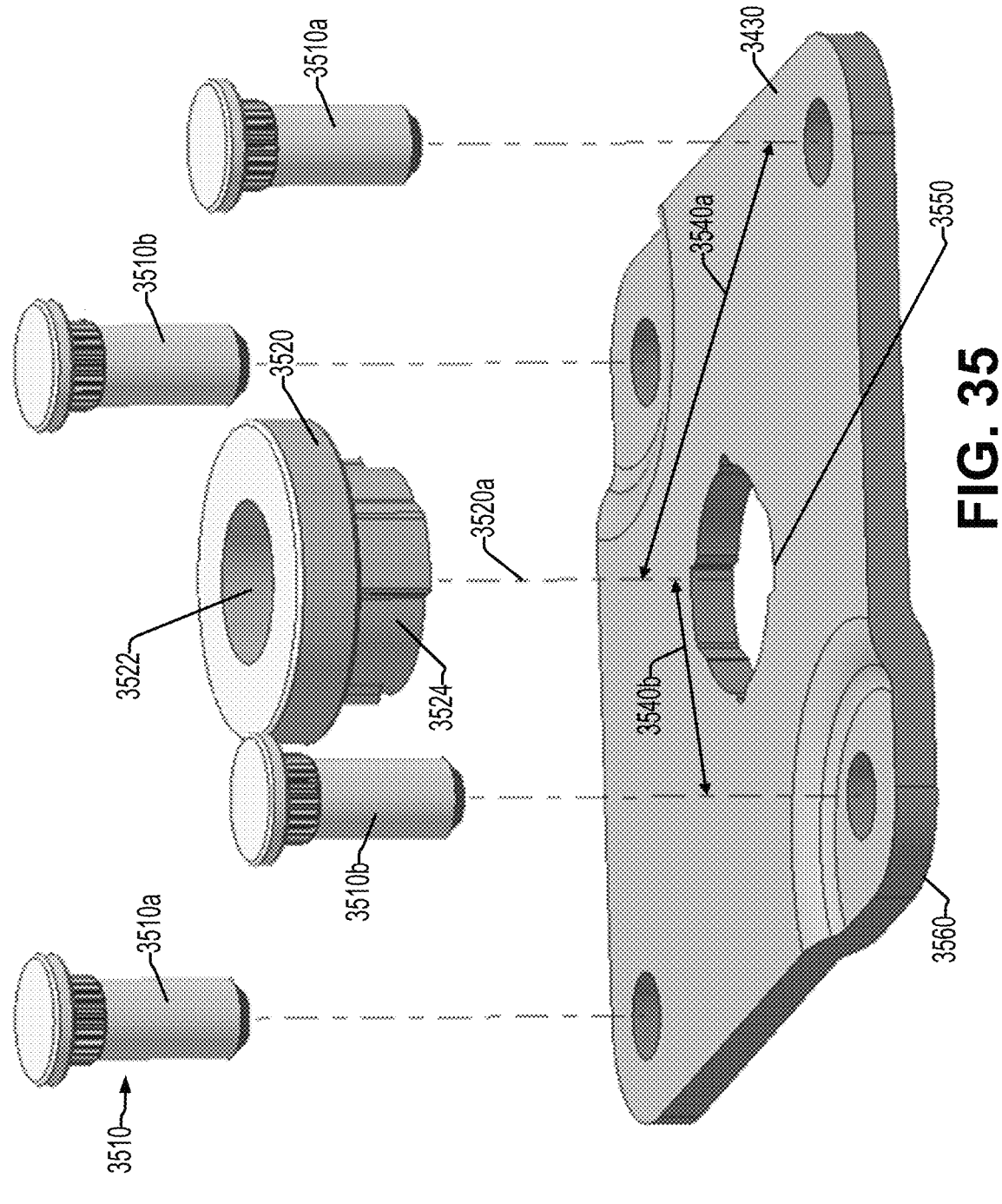
FIG. 35 shows an exploded blade adapter assembly for the fourth embodiment of a multi-blade cutter assembly of FIG. 34.
Figure 36:
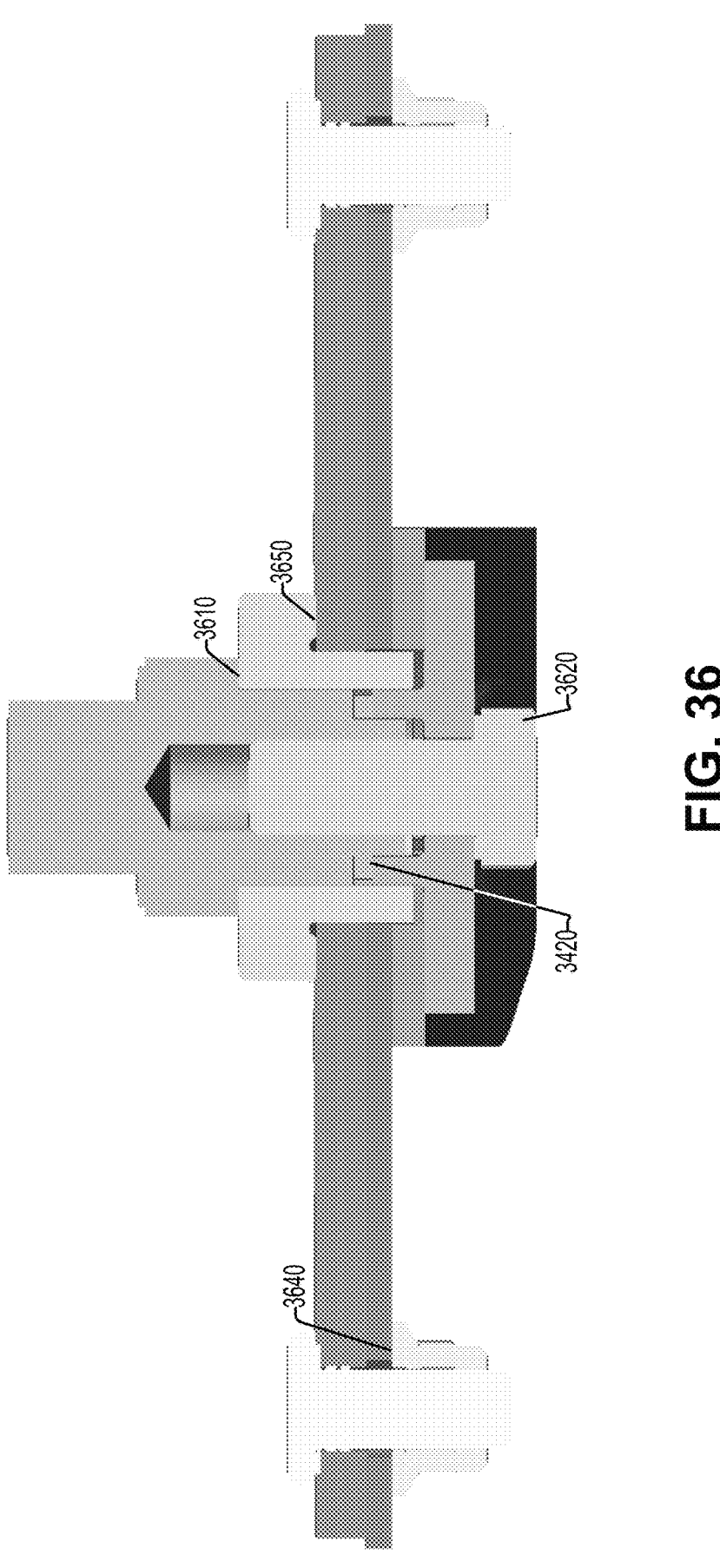
FIG. 36 shows a cross-section of the fourth embodiment of a multi-blade cutter assembly of FIG. 34 as assembled to an associated motor shaft.
Figure 39:
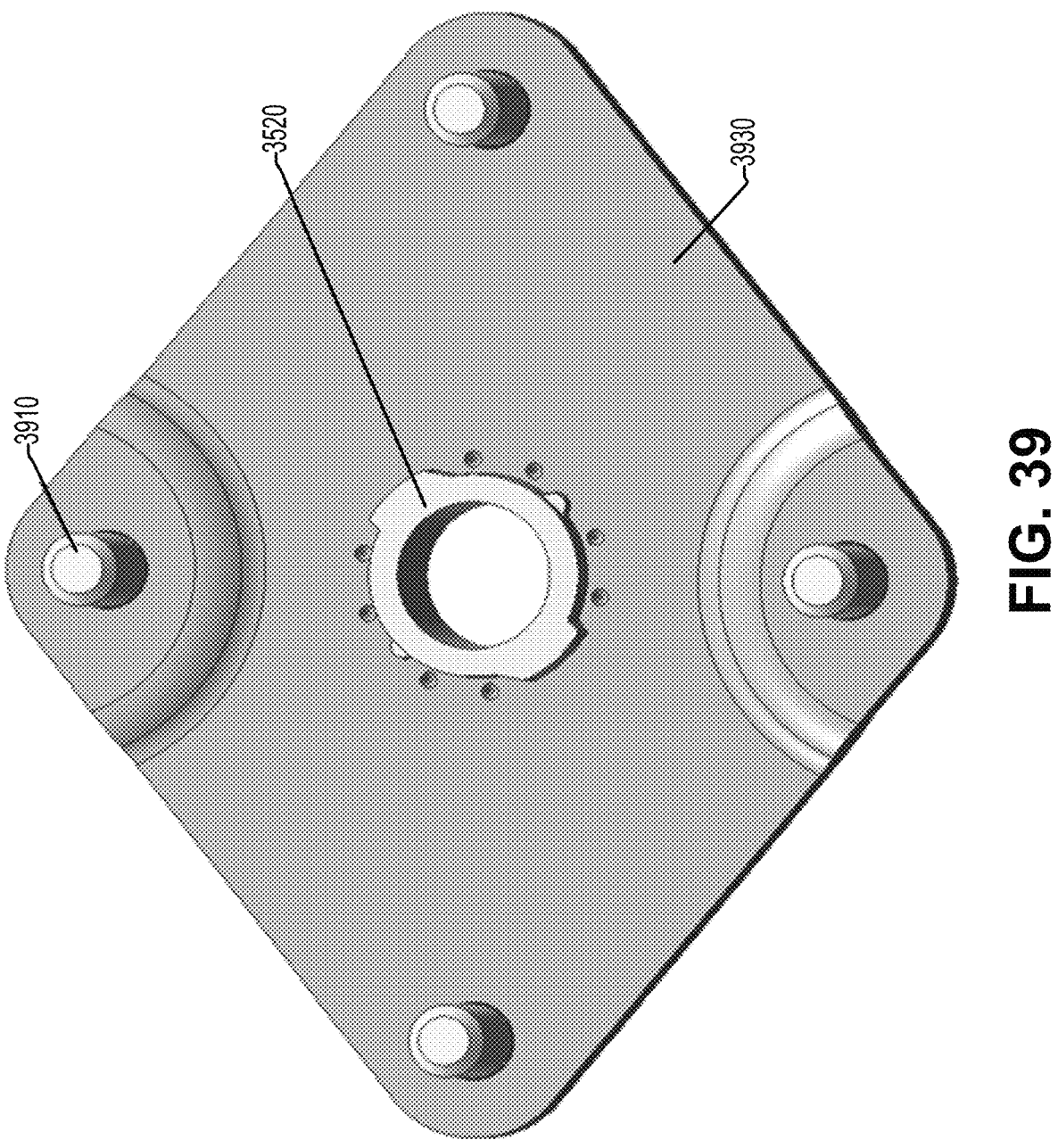
FIG. 39 shows a perspective view of the blade adapter assembly for the fourth embodiment of a multi-blade cutter assembly of FIG. 34.

With reference now to FIGS. 34-35, an additional example multi-blade cutter assembly 3400 is depicted showing a multi-blade adapter 3420, according to disclosed embodiments. In this example embodiment, adapter plate 3530 is situated above multiple blades, top blade 3430 and bottom blade 3440, and multi-blade cutter assembly 3400 can include anti-rotation washer 3450 situated below the multiple blades. Multiple blade adapter 3420 can comprise adapter hub 3520, adapter plate 3530, and clinch studs 3510, which are further detailed with reference to FIG. 36. As shown in FIGS. 34-36, the top blade 3430 and bottom blade 3440 may each be operationally connected to the multiple blade adapter 3420 with nuts 3640 adapted for threaded engagement with the clinch studs 3510. As referenced above, it should be understood that in other equally acceptable embodiments the blades may be operationally engaged with other mechanical fastener arrangements such as bolts paired to female threaded fasteners engaged with the multiple blade adapter. Clinch studs or other fasteners chosen with good engineering judgement may be engaged with the adapter plate by press fit or welding or brazing or other operations chosen with good engineering judgment. With additional reference now to FIGS. 35 and 39, the cutout 3550 is a hole in the adapter plate 3530 adapted to receive the adapter hub 3520, the adapter hub may be press fit into the cutout 3550 or engaged to the adapter plate by staking.

It has been found that with a well-chosen dimensions of the adapter plate 3530 one or more of the blades may be made substantially thinner than would otherwise be practical. In some such embodiments the blades are of differing thickness. In one embodiment the top blade 3430 is between 0.110 and 0.900 inches thick while the bottom blade 3440 is between 0.115 and 0.135 inches thick. In one embodiment the top blade 3430 is 0.1046+/−0.001 inches thick while bottom blade 3440 is between 0.125+/−0.001 inches thick. In some such embodiments the adapter plate 3530 dimensions between the clinch studs adapted for engagement with top blade 3430 is between 2 and 8 inches, or between 3 and 7 inches, or between 4 and 6 inches. In some such embodiments the adapter plate 3530 dimensions between the clinch studs adapted for engagement with bottom blade 3440 is between 2 and 8 inches, or between 3 and 7 inches, or between 4 and 6 inches. The resulting thinner blades have less air resistance and may store less kinetic energy in operation.

With continued reference to FIGS. 34, 35, and 36, FIG. 36 shows a cross-section of the multi-blade adapter 3420 and blades engaged to a motor or other work output shaft 3410. In the embodiment shown, the multi-blade adapter 3420 is mounted to the shaft 3410 by clamping it between a shaft shoulder 3610 and a mounting bolt 3620 threaded to the end of the shaft 3410. With reference now to FIG. 36, it can be seen that in this embodiment the adapter hub 3520 has an adapter shoulder 3650 which defines a physical limit against which the adapter plate 3530 seats as assembled. Further the cross-section of FIG. 36 shows that the anti-rotation washer 3450 comprises one or more retention tabs 3630 which engage with anti-rotation features 3415 in the shaft 3410. It should be understood that the anti-rotation washer 3450 is held from rotating with respect to shaft 3410 when assembled as shown in FIG. 36. It should further be understood that the adapter hub 3520 inner surface 3522 may be substantially smooth cylindrical such that the all of torque in operation is transmitted with the clamp load from bolt at end of shaft.

Figure 37:
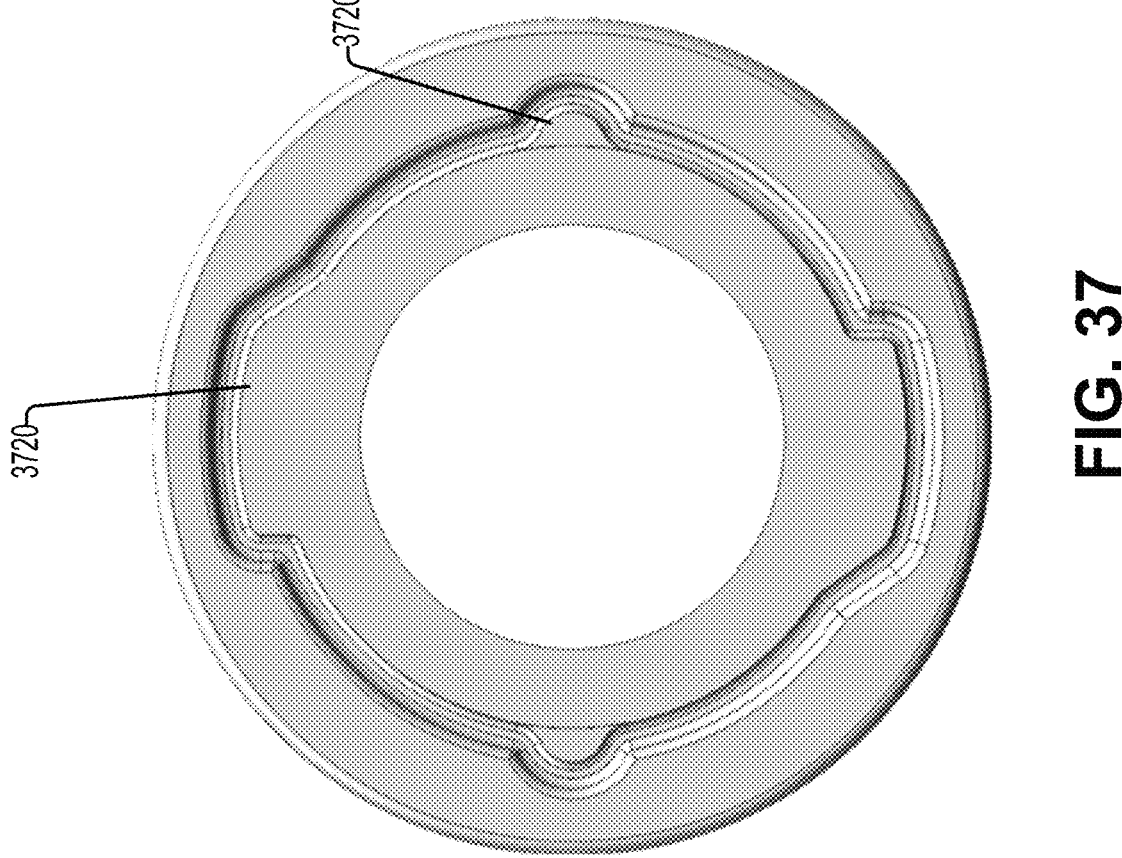
FIG. 37 shows a bottom view of the adapter hub of the blade adapter assembly of FIG. 35.
Figure 38:
FIG. 38 shows a side view of the adapter hub of the blade adapter assembly of FIG. 35.

Turning now to FIGS. 37 and 38, respectively illustrated are a bottom view of the adapter hub 3520 from the multi-blade adapter 3420 and a side view of the adapter hub 3520 from the multi-blade adapter 3420, according to disclosed embodiments. With continued reference to FIGS. 34, 35, 37 and 38, multi-blade adapter 3420 can comprise adapter hub 3520. Adapter hub 3520 can comprise an inner surface 3522 configured to couple to a shaft (e.g., shaft 3410) of an outdoor power equipment motor or other shaft engaged therewith, and an outer surface 3524 configured to couple to multiple cutting blades (e.g., top blade 3430 and bottom blade 3440). The outer surface can comprise a wing 3710 and a boss 3720 (c.f., asymmetric buttresses 908). It should be noted that in the embodiment shown in FIGS. 37 and 38, the wing 3710 extends the full height of the adapter hub 3520 while the boss 3720 does not extend the full height of the adapter hub 3520 so that the perimeter defined by the outer surface 3524 of the adapter hub varies with height along the adapter hub.

Additionally, multi-blade adapter 3420 can comprise adapter plate 3530, which can be coupled to adapter hub 3520 or can be integrated with adapter hub 3520. Adapter plate 3530 can be engaged with clinch studs 3510 configured to mate with apertures or cutouts of the multiple cutting blades. Clinch studs 3510 on opposing sides of adapter plate 3530 are paired, such that pair 3510a is coupled to a same blade of the multiple blades (top blade 3430 or bottom blade 3440 in this embodiment), and pair 3510b is coupled to a same blade of the multiple blades (top blade 3430 or bottom blade 3440 in this embodiment) whereas adjacent clinch studs 3510 couple to different blades of the multiple blades.

Referring now to FIG. 35 and similarly to that shown in FIG. 14B above, the clinch studs 3510 of clinch stud pair 3510a can each be situated at a first offset 3540a from the center axis 3520a of the adapter hub 3520. Likewise, clinch studs 3510 of clinch stud pair 3510b can each be situated at a second offset 3540b from the center axis 3520a of the adapter hub 3520. In the embodiment shown in FIGS. 34-36 and in some other embodiments, first offset 3540a and second offset 3540b differ, giving adapter plate 3530 a rhomboidal shape.

As with previously discussed embodiments, multi-blade adapter 3420 can further comprise at least one dais 3560. Dais 3560 can change a height level of clinch studs 3510b relative to clinch studs 3510a. Hence, a first installed blade, top blade 3430, mates with clinch studs 3510a and does not interface with dais 3560 or clinch studs 3510b. However, a second installed blade, bottom blade 3440, is seated under the top blade 3430. Thus, the bottom blade 3440, is in contact with dais 3560 and mates with clinch studs 3510*b*. In some embodiments, a height of dais 3560 can correspond to a thickness of the first installed blade.

Figure 40:
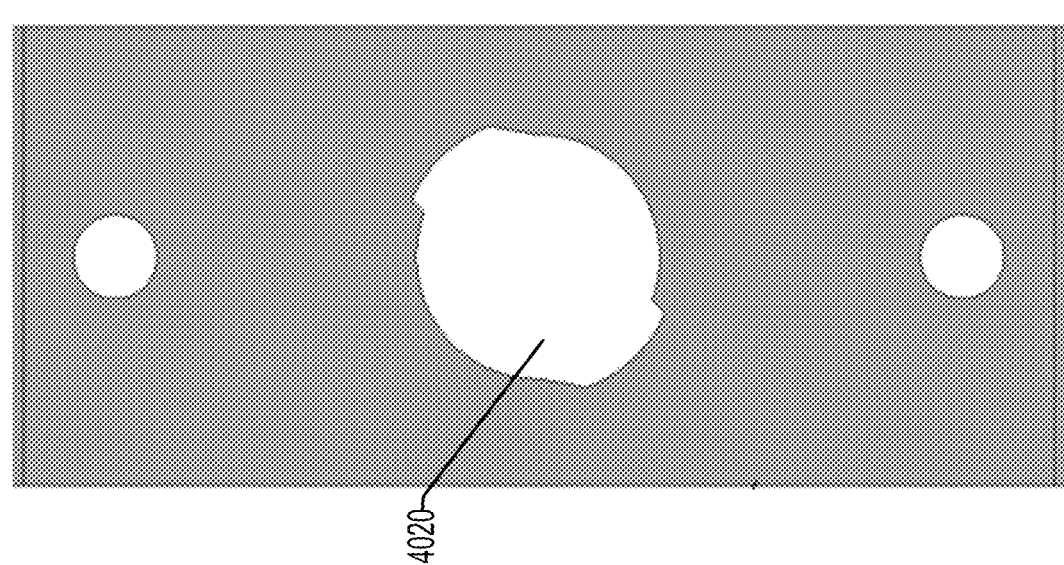
FIG. 40 shows a close up of the unassembled set of blades of the fourth embodiment of a multi-blade cutter assembly of FIG. 34.
Figure 40:
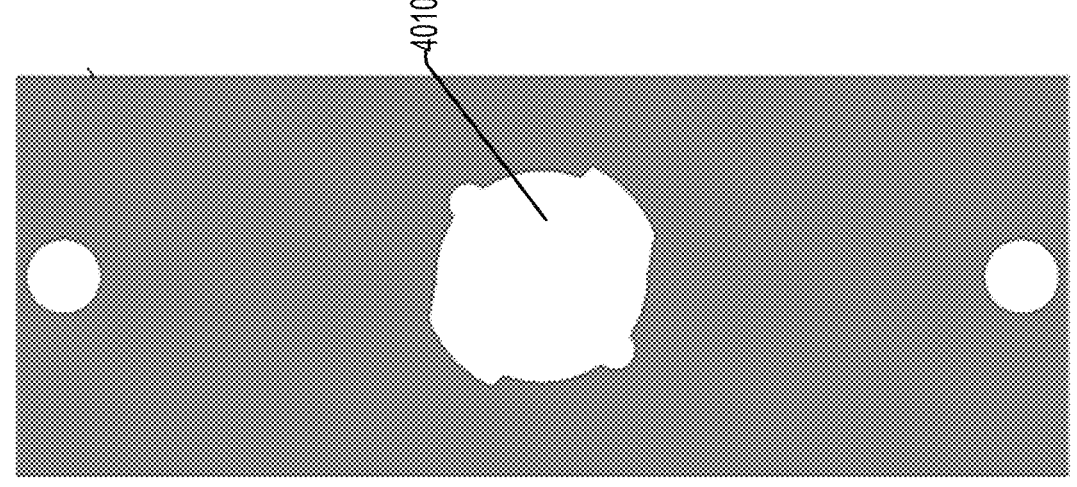

FIG. 40 shows a close up of top blade 3430 and bottom blade 3440. Top blade 3430 has a cutout 4010 and bottom blade 3440 has a cutout 4020. Cutout 4010 differs from cutout 4020 such that cutout 4010 is the larger cutout such that all objects that will pass through 4020 will also pass through 4010 but there are objects that will pass though 4010 that will not also pass through 4020. More specifically, cutout 4010 is adapted to accommodate boss 3720 and wing 3710 while cutout 4020 is adapted to accommodate wing 3710 but not boss 3720. As such, because cutouts 4010 and 4020 differ, the blades 3430, 3440 cannot be interchanged in installation without assembly issues.

Figure 41:
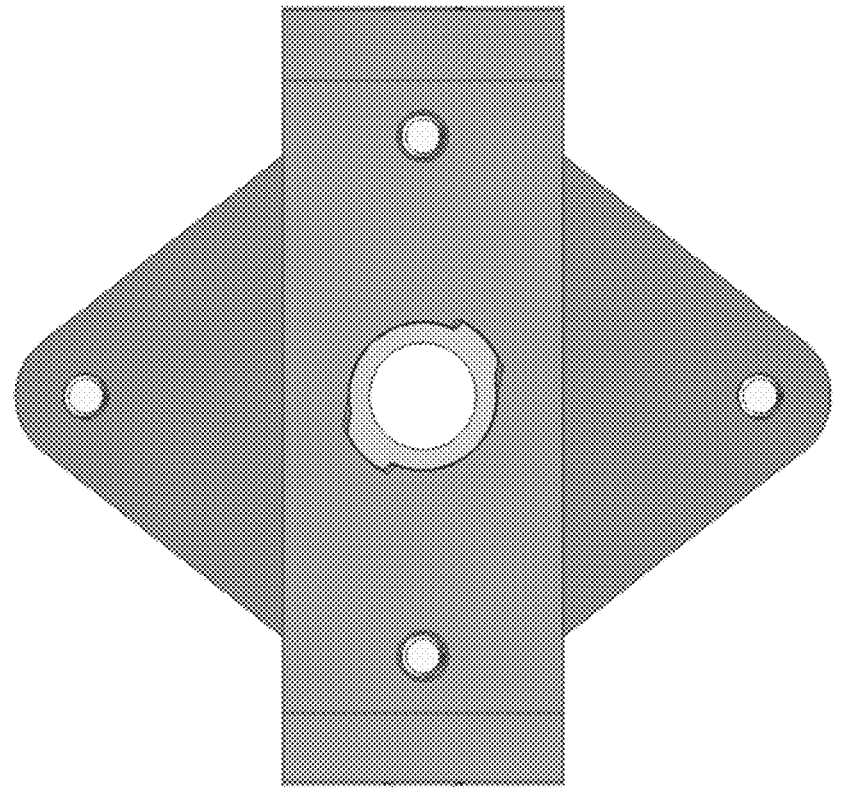
FIG. 41 shows each of the blades from FIG. 40 as properly assembled with the blade adapter assembly for the fourth embodiment of a multi-blade cutter assembly of FIG. 34.
Figure 41:
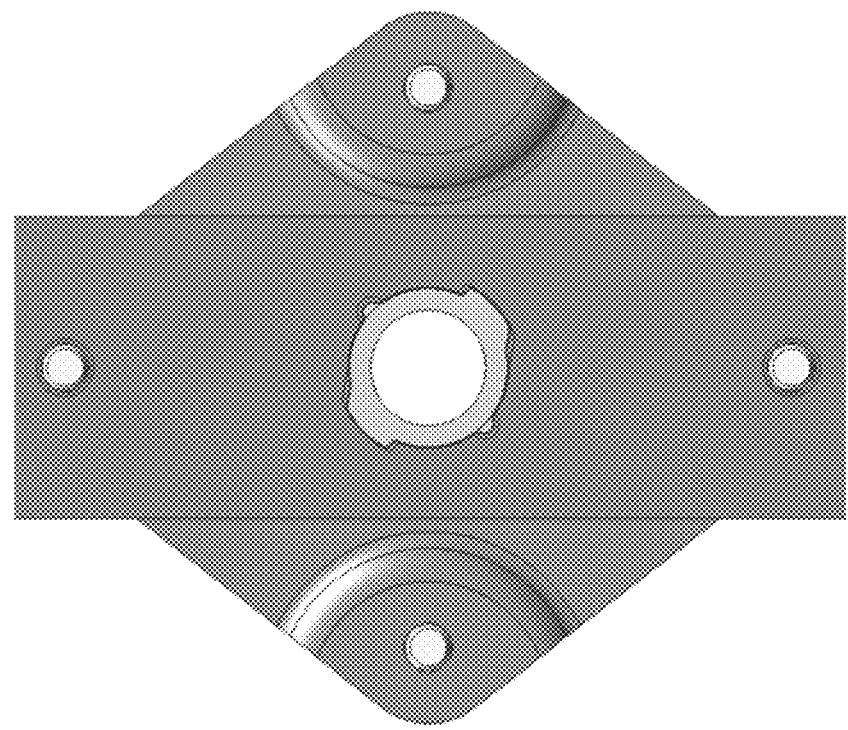
Figure 42:
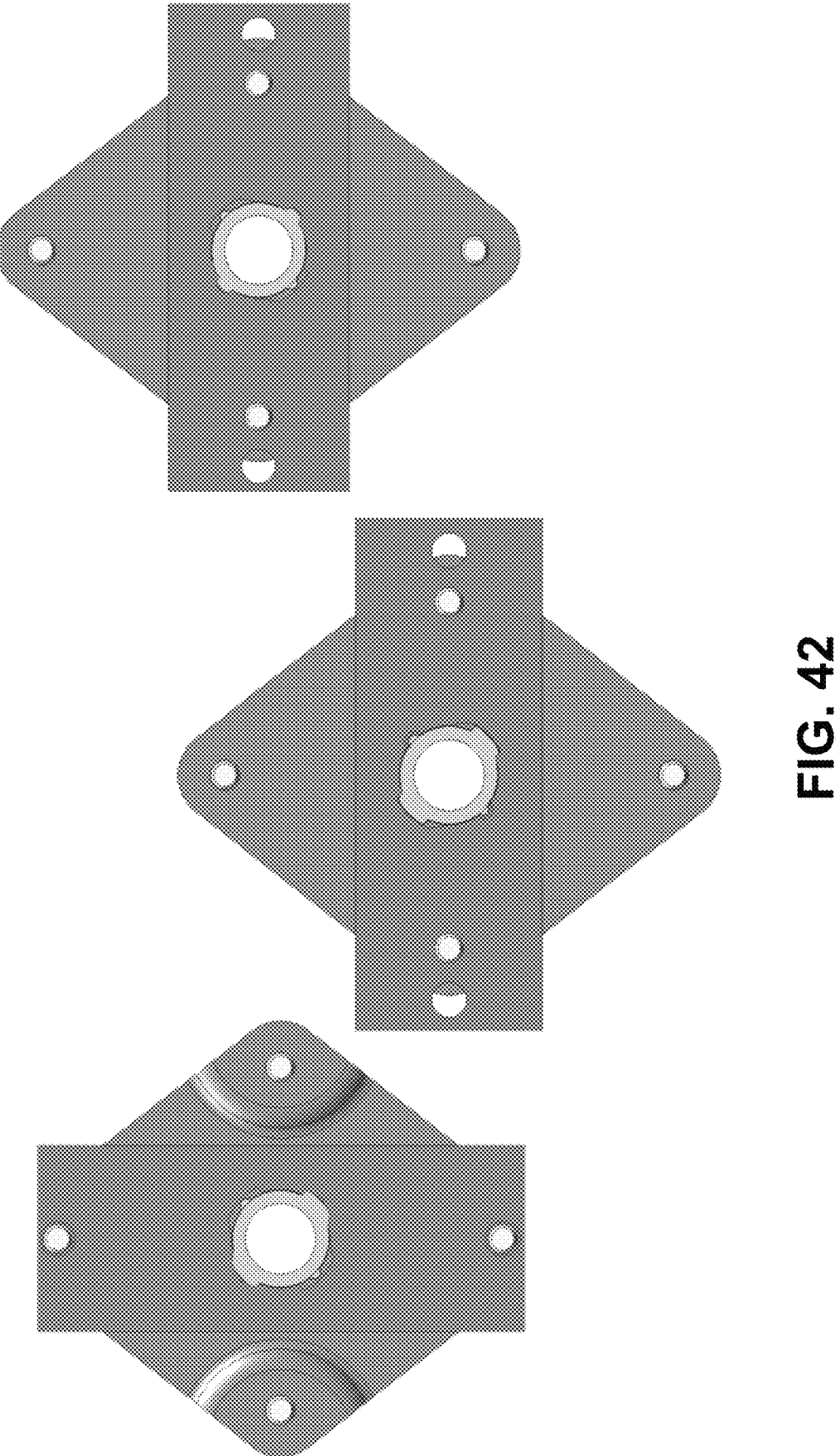
FIG. 42 shows the top blade of the fourth embodiment of a multi-blade cutter assembly in a variety of incorrect assembly positions and orientations.
Figure 43:
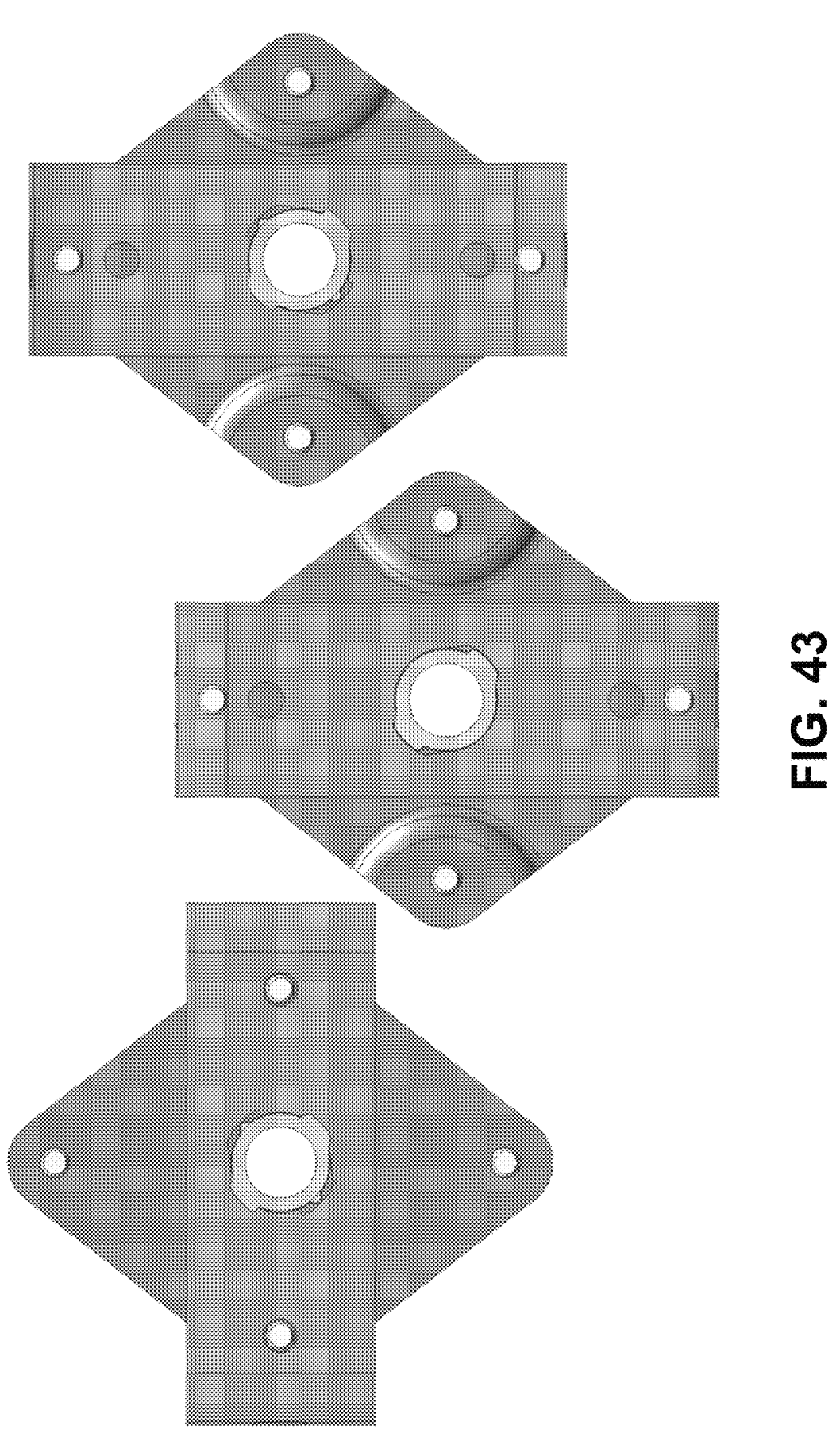
FIG. 43 shows the top blade of the fourth embodiment of a multi-blade cutter assembly in a variety of incorrect assembly positions and orientations.

Referring now to FIG. 41, shown are top blade 3430 and bottom blade 3440 in their proper assembly positions and orientations with respect to multi-blade adapter 3420. By way of contrast and with reference now to FIGS. 42 and 43 shown are arrangements of the blades in improper assembly positions and/or orientations with respect to the multi-blade adapter 3420.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or", so that usage of "or" can have the same meaning as "and/or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be limited to those illustrations. Rather, any suitable combination or subset of elements from one drawing(s) can be applied to other embodiments in other drawings where suitable to one of ordinary skill in the art to accomplish objectives disclosed herein, known in the art, or reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A blade adapter apparatus, comprising:

an inner surface configured to couple to a shaft of an outdoor power equipment motor; and an outer surface configured to couple to multiple cutting blades, the outer surface comprising:

an asymmetric buttress configured to mate with a first blade of the multiple cutting blades in a manner that prevents the first blade from being coupled according to an improper orientation, the asymmetric buttress comprising:

a salient face having a lateral length;

a first side face that meets the salient face at a first angle relative to the lateral length; and a second side face that meets the salient face at a second angle relative to the lateral length, wherein the first angle differs from the second angle, resulting in the asymmetric buttress being asymmetric;

further comprising a base disk having a radius that is greater than a radius of the salient face of the asymmetric buttress;

further comprising a dimple, extending in an axial direction from the base disk, configured to mate with a corresponding aperture of a blade of the multiple cutting blades in a manner that prevents the first blade and the second blade from being coupled according to an improper order.

2. A blade adapter apparatus, comprising:

an inner surface configured to couple to a shaft of an outdoor power equipment motor; and an outer surface configured to couple to multiple cutting blades, the outer surface comprising:

an asymmetric buttress configured to mate with a first blade of the multiple cutting blades in a manner that prevents the first blade from being coupled according to an improper orientation, the asymmetric buttress comprising:

a salient face having a lateral length;

a first side face that meets the salient face at a first angle relative to the lateral length;

a second side face that meets the salient face at a second angle relative to the lateral length, wherein the first angle differs from the second angle, resulting in the asymmetric buttress being asymmetric;

further comprising a blade mounting plate configured to couple the multiple cutting blades and to maintain a defined angle between adjacent ones of the multiple cutting blades; and wherein the blade mounting plate comprises:

a first pin, situated at a first location at a first radius from an axis of rotation, configured to mate with an aperture of the first blade; and a second pin, situated at a second location at a second radius from the axis of rotation, configured to mate with an aperture of a second blade of the multiple cutting blades.

3. A multi-blade assembly, comprising:

a blade adapter apparatus having:

a base defining a base surface;

an outer surface extending between the base surface and a top of the multi-blade assembly to define an outer surface height, the outer surface configured to operationally engage simultaneously with a first blade and a second blade, with each blade being located at different height;

an inner surface defining an axis of rotation and configured to operationally engage with an associated shaft;

a first buttress;

extending from the outer surface, and adapted to prevent the first blade from being coupled according to an improper orientation; and wherein the first buttress is asymmetric;

the first blade operationally engaged with the outer surface at a first height; and the second blade operationally engaged with the outer surface at a second height.

4. The multi-blade assembly of claim 3, wherein the first buttress has a first buttress salient face having a first buttress lateral length;

a first side face of the first buttress extending between the outer surface and the first buttress salient face, the first side face of the first buttress meeting the first buttress salient face at a first angle of the first buttress relative to the first buttress lateral length;

a second side face of the first buttress extending between the outer surface and the first buttress salient face, the second side face of the first buttress meeting the first buttress salient face at a second angle of the first buttress relative to the first buttress lateral length; and wherein the first angle of the first buttress differs from the second angle of the first buttress.

5. The multi-blade assembly of claim 4, wherein the blade adapter apparatus further comprises a second buttress extending from the outer surface, adapted to prevent the first blade or the second blade from being coupled according to an improper orientation, the second buttress having, a second buttress salient face having a second buttress lateral length;

a first side face of the second buttress extending between the outer surface and the second buttress salient face, the first side face of the second buttress meeting the second buttress salient face at a first angle of the second buttress relative to the second buttress lateral length;

a second side face of the buttress extending between the outer surface and the second buttress salient face, the second side face of the second buttress meeting the second buttress salient face at a second angle of the second buttress relative to the second buttress lateral length; and wherein the first angle of the second buttress differs from the second angle of the second buttress such that the second buttress is asymmetric.

6. The blade adapter apparatus of claim 5, wherein each buttress salient face is an arc defining a subsection of a cylinder centered on the axis of rotation and offset from the axis of rotation by some radial distance.

7. The blade adapter apparatus of claim 6, wherein each arc subtends between 30 and 60 degrees about the axis of rotation.

8. The blade adapter apparatus of claim 7, wherein the second buttress is positioned on the outer surface at between 60 and 120 degrees about the axis of rotation from the first buttress.

\* \* \* \* \*